United States Patent
Nagano et al.

(10) Patent No.: US 10,051,188 B2
(45) Date of Patent: Aug. 14, 2018

(54) INFORMATION PROCESSING DEVICE AND IMAGE SHOOTING DEVICE FOR DISPLAY OF INFORMATION ON FLEXIBLE DISPLAY

(71) Applicant: SONY CORPORATION, Tokyo (JP)

(72) Inventors: Daisuke Nagano, Kanagawa (JP);
Daisuke Sato, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/782,048

(22) PCT Filed: Feb. 20, 2014

(86) PCT No.: PCT/JP2014/054077
§ 371 (c)(1),
(2) Date: Oct. 2, 2015

(87) PCT Pub. No.: WO2014/171179
PCT Pub. Date: Oct. 23, 2014

(65) Prior Publication Data
US 2016/0057356 A1 Feb. 25, 2016

(30) Foreign Application Priority Data
Apr. 19, 2013 (JP) ................................ 2013-088457

(51) Int. Cl.
*H04N 5/232* (2006.01)
*G09G 3/00* (2006.01)
(Continued)

(52) U.S. Cl.
CPC ....... *H04N 5/23293* (2013.01); *G06F 1/1652* (2013.01); *G09G 3/002* (2013.01);
(Continued)

(58) Field of Classification Search
CPC ............... G06F 3/04842; G06F 3/0412; G06F 3/04845; G06F 3/0488; G06F 2203/04102;
(Continued)

(56) References Cited

U.S. PATENT DOCUMENTS

| 8,279,174 B2* | 10/2012 | Jee ........................ G06F 1/1615 345/1.1 |
| 2010/0117975 A1* | 5/2010 | Cho ....................... G06F 1/1626 345/173 |
| 2014/0002419 A1* | 1/2014 | Thorson .................. G06F 3/147 345/175 |

FOREIGN PATENT DOCUMENTS

| JP | 2003-295291 A | 10/2003 |
| JP | 2005-278058 A | 10/2005 |

(Continued)

OTHER PUBLICATIONS

Extended European Search Report of EP Patent Application No. 14785999.5, dated Oct. 17, 2016, pp. 7.

*Primary Examiner* — Trung Diep
(74) *Attorney, Agent, or Firm* — Chip Law Group

(57) ABSTRACT

[Object] To display a captured image on a display unit in accordance with the intention of a user.
[Solution] An information processing device according to the present technology includes a reception unit configured to receive operation information on a user, and a control unit configured to decide, on the basis of a state of a flexible display unit pulled out from a body of an image shooting device, a corresponding range corresponding to a displayable area of the pulled-out display unit from an entire image range acquired by an image shooting unit, the state being received by the reception unit, the flexible display unit being capable of being pulled out from the body.

9 Claims, 24 Drawing Sheets

(51) Int. Cl.
*G06F 1/16* (2006.01)
*H04M 1/02* (2006.01)
*H04N 5/225* (2006.01)

(52) U.S. Cl.
CPC .......... *G09G 3/003* (2013.01); *H04M 1/0268* (2013.01); *H04N 5/2251* (2013.01); *H04N 5/23216* (2013.01); *H04M 2250/52* (2013.01)

(58) Field of Classification Search
CPC ................ G06F 1/1652; G06F 3/0414; G06F 2203/04806; H01L 2251/5338; H04M 1/0268; H04M 1/72522; H04N 5/4403
USPC ................ 348/333.01–333.05; 345/156, 175
See application file for complete search history.

(56) References Cited

FOREIGN PATENT DOCUMENTS

| | | |
|---|---|---|
| JP | 2006-060585 A | 3/2006 |
| JP | 2006-229907 A | 8/2006 |
| JP | 2009-021660 A | 1/2009 |
| JP | 2011-114509 A | 6/2011 |

\* cited by examiner

FIG. 10
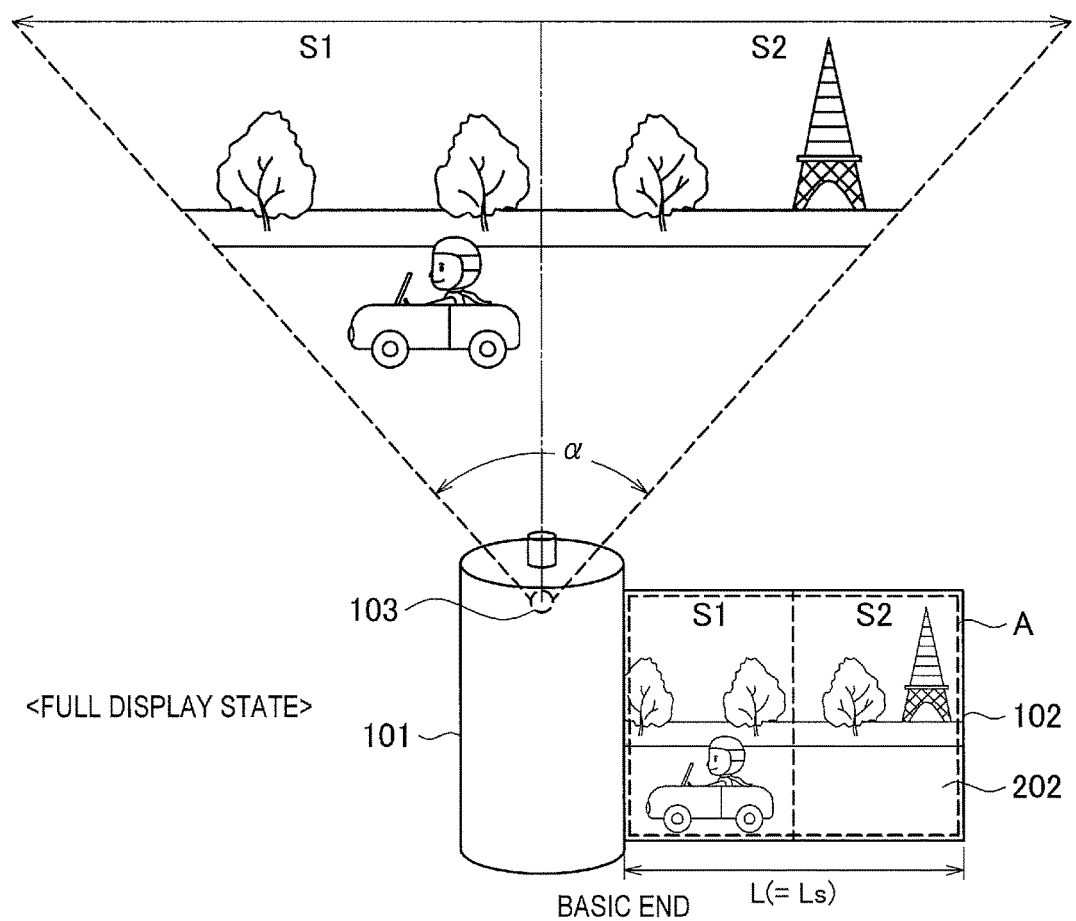
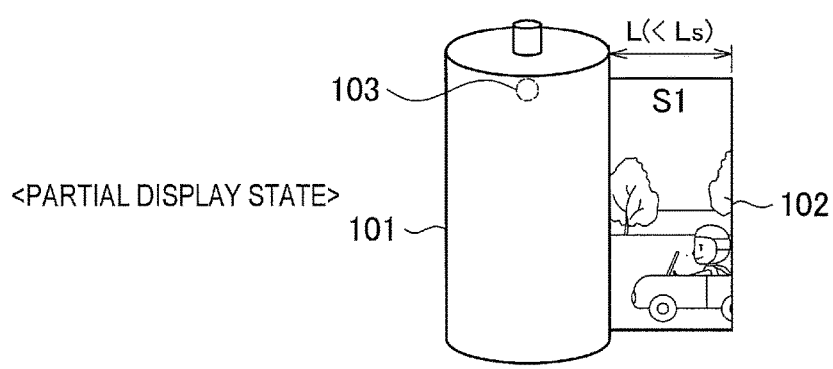

FIG. 12
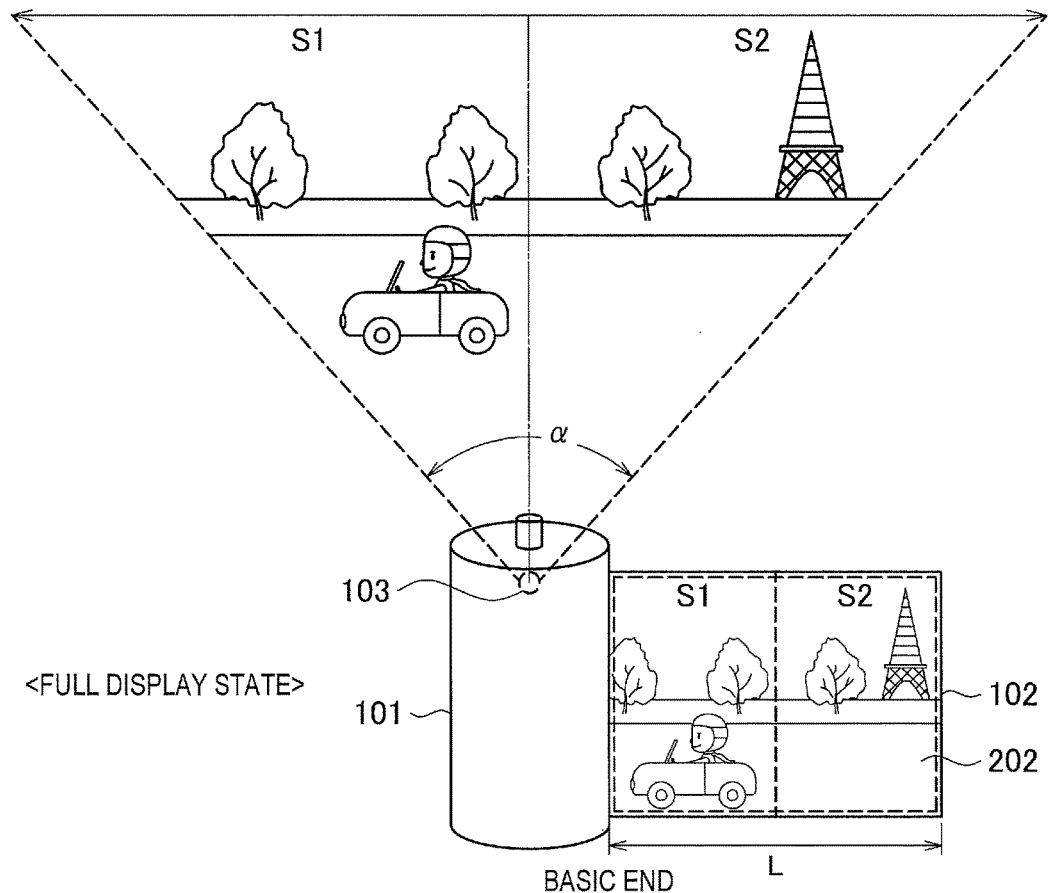
<FULL DISPLAY STATE>
BASIC END
⬇ UNFOLD
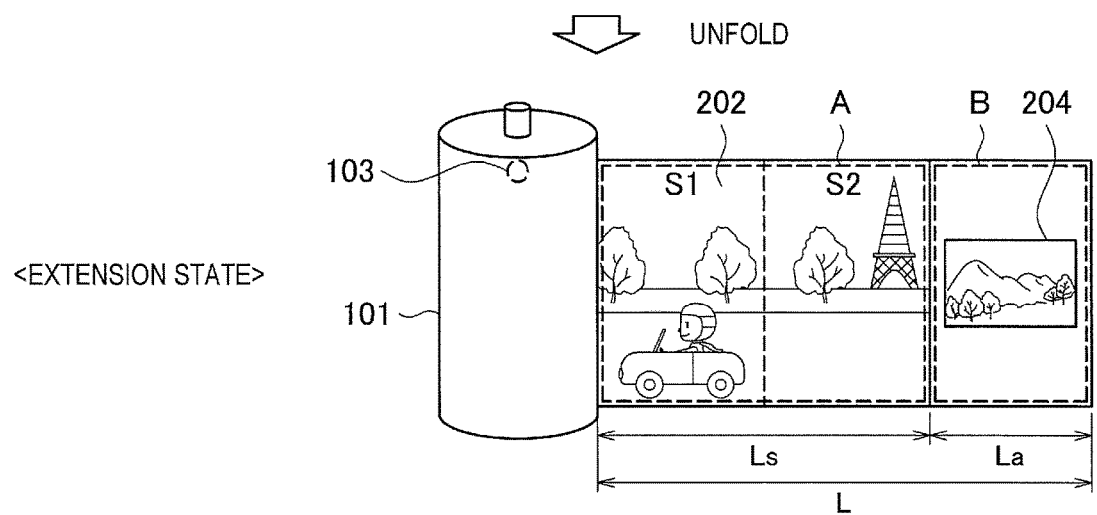
<EXTENSION STATE>

FIG. 14
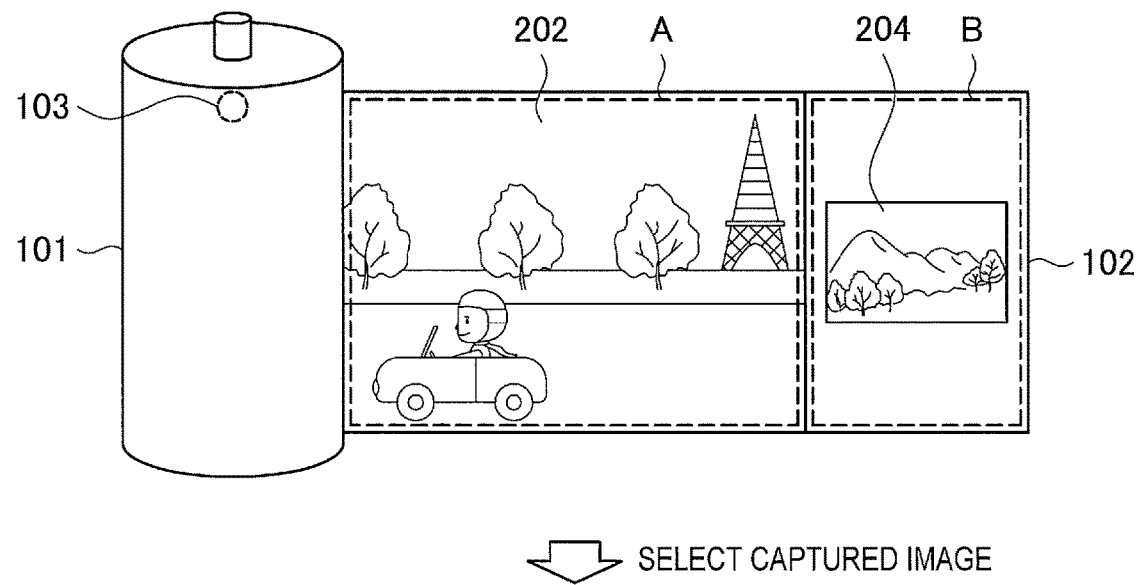
SELECT CAPTURED IMAGE
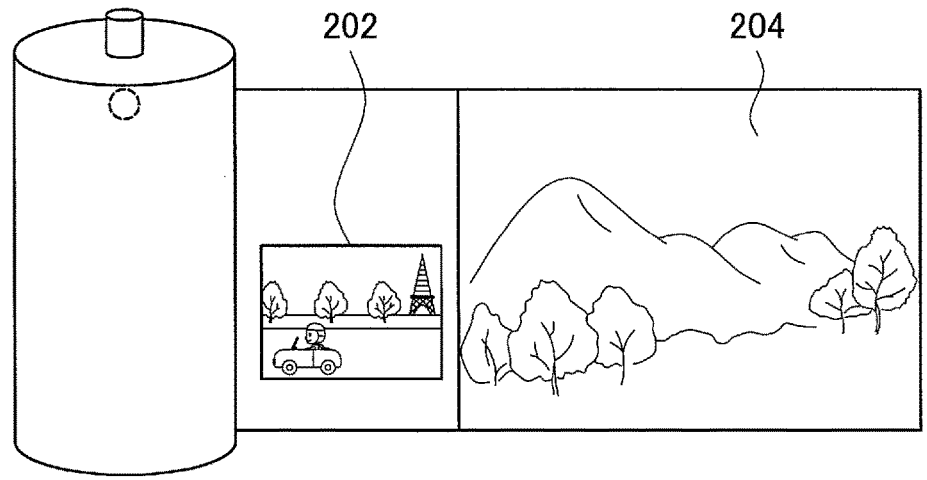

FIG. 22
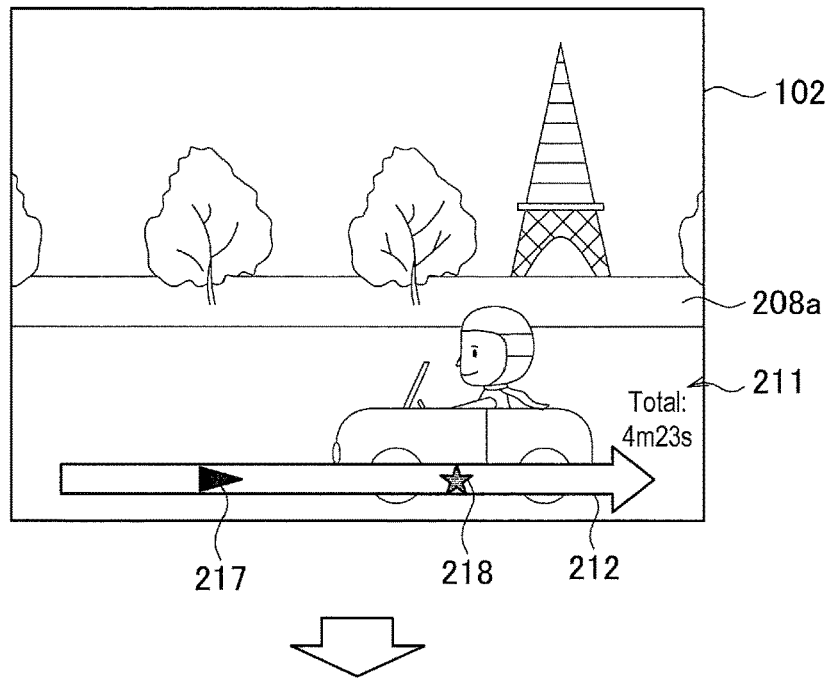
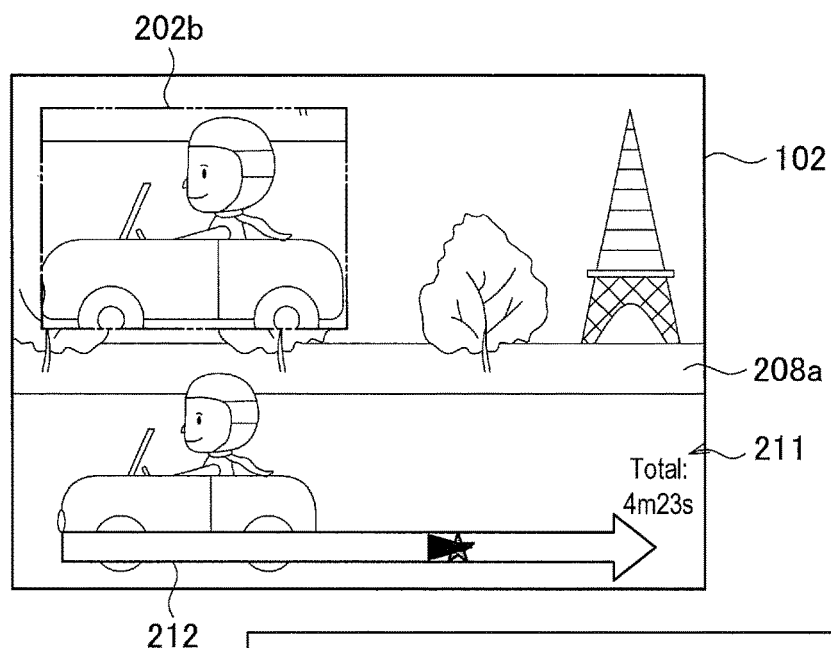

INFORMATION PROCESSING DEVICE AND IMAGE SHOOTING DEVICE FOR DISPLAY OF INFORMATION ON FLEXIBLE DISPLAY

TECHNICAL FIELD

The present disclosure relates to an information processing device that performs a display process for an image on a display unit, an information processing method, and an image shooting device.

BACKGROUND ART

There are provided today flexible display devices such as film-like liquid crystal panels and organic EL displays. Such display devices can be folded and bent, so that the display devices can be neatly stored in devices such as digital cameras.

For example, Patent Literature 1 discloses a digital camera that includes a flexible display unit and allows a user to securely hold the display unit when the digital camera is used. The aspect ratio of an image displayed on the display unit in the digital camera described in Patent Literature 1 is changed in accordance with the amount of the display unit to be pulled out when the digital camera is used, thereby making it possible to change the aspect ratio of an image to be actually captured by the lens.

CITATION LIST

Patent Literature

Patent Literature 1: JP 2009-21660A

SUMMARY OF INVENTION

Technical Problem

The invention described in Patent Literature 1, however, changes the aspect ratio of an image to be actually captured in accordance with the amount of the display unit to be pulled out, so that it is not possible to control or display an image capturing range intended by a user. Accordingly, it is desired to display a captured image on a display unit in accordance with the intention of a user.

Solution to Problem

According to the present disclosure, there is provided an information processing device including: a reception unit configured to receive operation information on a user; and a control unit configured to decide, on the basis of a state of a flexible display unit pulled out from a body of an image shooting device, a corresponding range corresponding to a displayable area of the pulled-out display unit from an entire image range acquired by an image shooting unit, the state being received by the reception unit, the flexible display unit being capable of being pulled out from the body.

In addition, according to the present disclosure, there is provided an information processing method including: deciding, on the basis of a state of a flexible display unit pulled out from a body of an image shooting device, a corresponding range corresponding to a displayable area of the pulled-out display unit from an entire image range acquired by an image shooting unit, the flexible display unit being capable of being pulled out from the body.

Furthermore, according to the present disclosure, there is provided an image shooting device including: an image shooting unit; a body including a reception unit that receives operation information on a user; a flexible display unit capable of being pulled out from the body; and a control unit configured to decide, on the basis of a state of the display unit pulled out from the body, a corresponding range corresponding to a displayable area of the pulled-out display unit from an entire image range acquired by the image shooting unit.

According to the present disclosure, operation information indicating an operation performed by a user is used to decide, on the basis of the state of a flexible display unit pulled out from the body, the corresponding range to be displayed on a displayable area of the display unit from the entire range of a shot image. This makes it possible to display a shot image on a display unit in accordance with the intention of a user and to present a shot image without making a user feel strange.

Advantageous Effects of Invention

According to the present disclosure as described above, it is possible to display a captured image on a display unit in accordance with the intention of a user.

BRIEF DESCRIPTION OF DRAWINGS

FIG. 10 is an explanatory diagram for describing a range of a shot image displayed on the display unit, the range changing in accordance with a state of the display unit pulled out from the body.

FIG. 12 is an explanatory diagram illustrating an example of information displayed on the display unit in an extension state.

FIG. 14 is an explanatory diagram illustrating an example in which a captured image displayed on an extended area of the display unit is enlarged.

FIG. 22 is an explanatory diagram for describing another display process performed by the control unit in the image shooting device according to the embodiment.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be now made in the following order.
1. First Embodiment
   1.1. Schematic Configuration of Image Shooting Device
   1.2. Functional Configuration of Image Shooting Device
   1.3. Overview of Display Process]
   1.4. Display Process Based on State of Pulled-Out Display Unit
      1.4.1. Basic Process
      1.4.2. Display Process on Extended Area of Display Unit
         (a) Use of Extended Area
         (b) Enlargement of Captured Image Displayed on Extended Area
         (c) Display Information on Extended Area while Moving Image is being Captured
2. Second Embodiment (Display Process Based on Focal Distance of Eyes of User)
3. Third Embodiment (Two Image Shooting Units are Installed)
4. Fourth Embodiment (Image Shooting Device Having Communication Function)
   4.1. Schematic Configuration of Image Shooting Device
   4.2. Switching Functions of Image Shooting Device

1. First Embodiment

1.1. Schematic Configuration of Image Shooting Device

Figure 1:
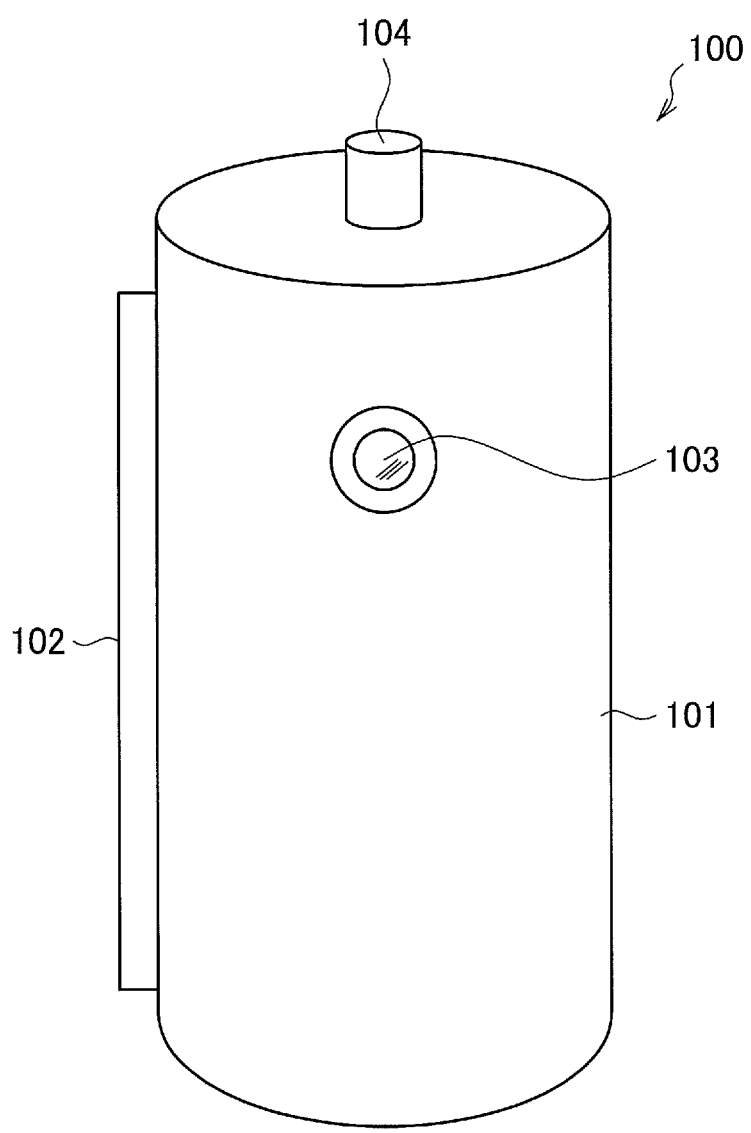
FIG. 1 is a front view illustrating a configuration example of an image shooting device according to a first embodiment of the present disclosure.
Figure 2:
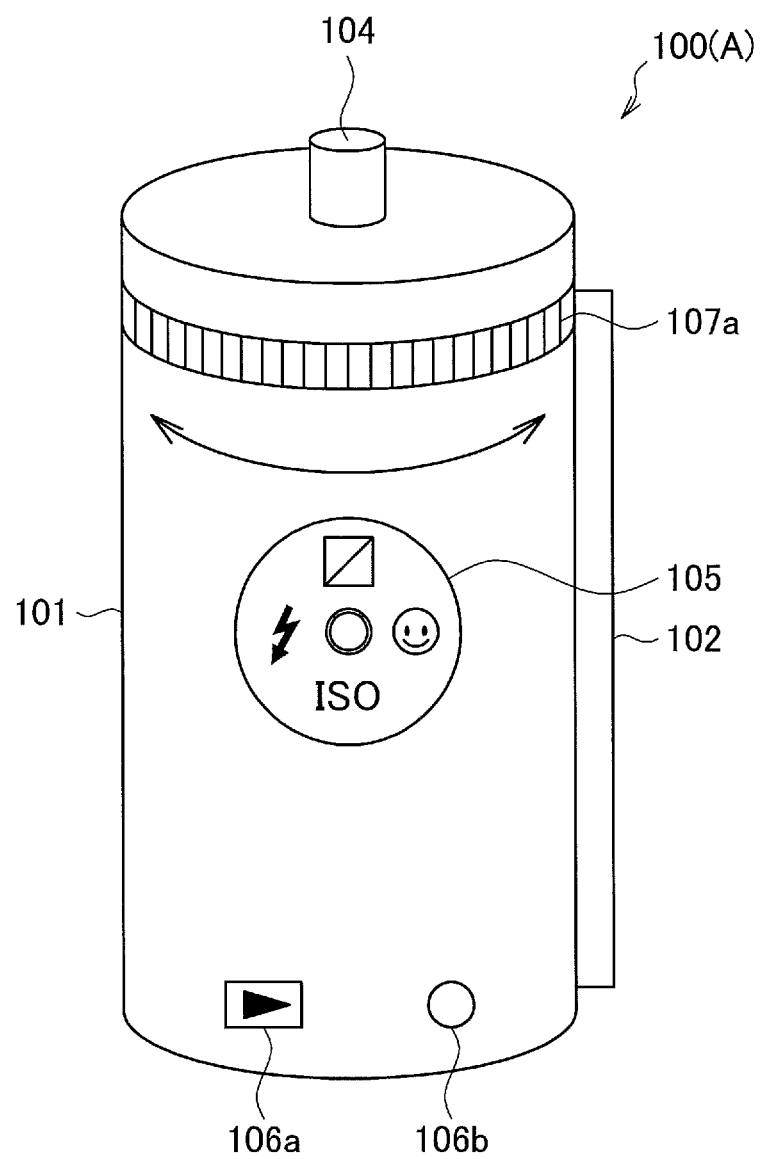
FIG. 2 is a rear view illustrating a configuration example of the image shooting device according to the embodiment.
Figure 3:
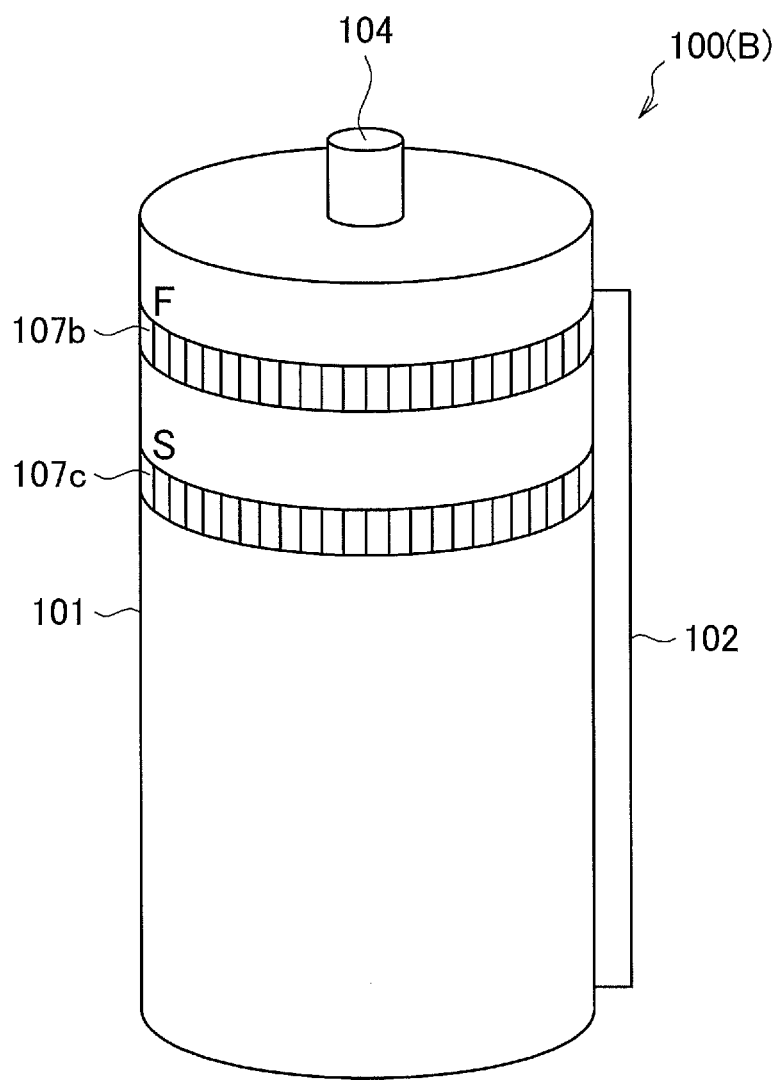
FIG. 3 is a rear view illustrating another configuration example of the image shooting device according to the embodiment.
Figure 4:
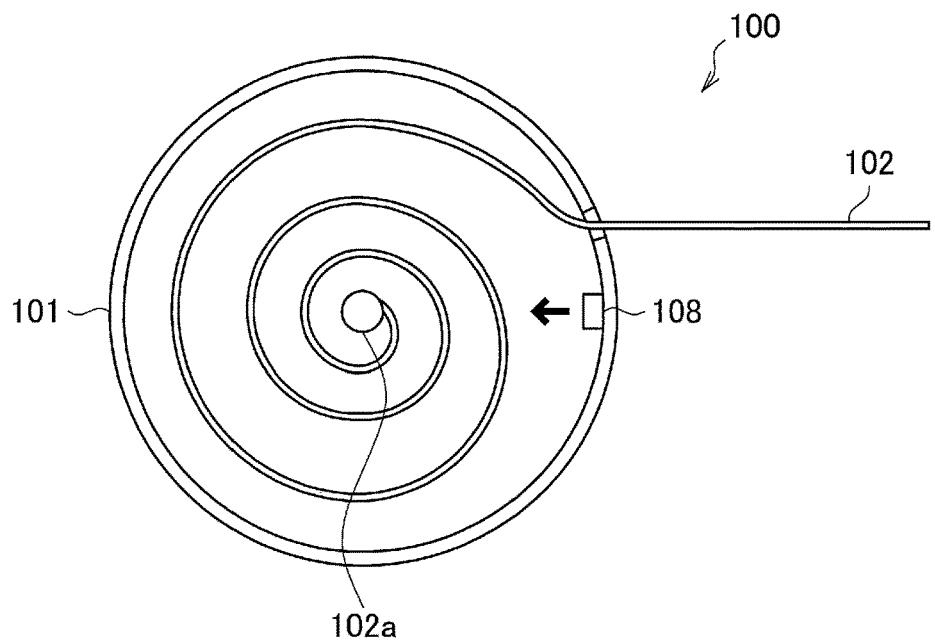
FIG. 4 is an explanatory diagram illustrating an example of a state of the stored display unit of the image shooting device according to the embodiment.
Figure 5:
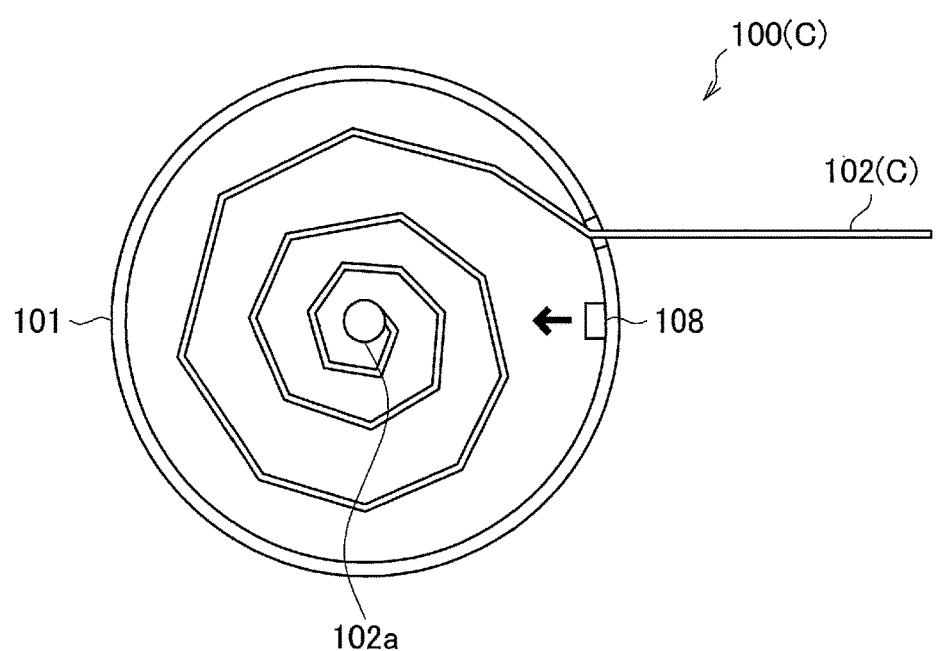
FIG. 5 is an explanatory diagram illustrating another example of a state of the stored display unit of the image shooting device according to the embodiment.
Figure 6:
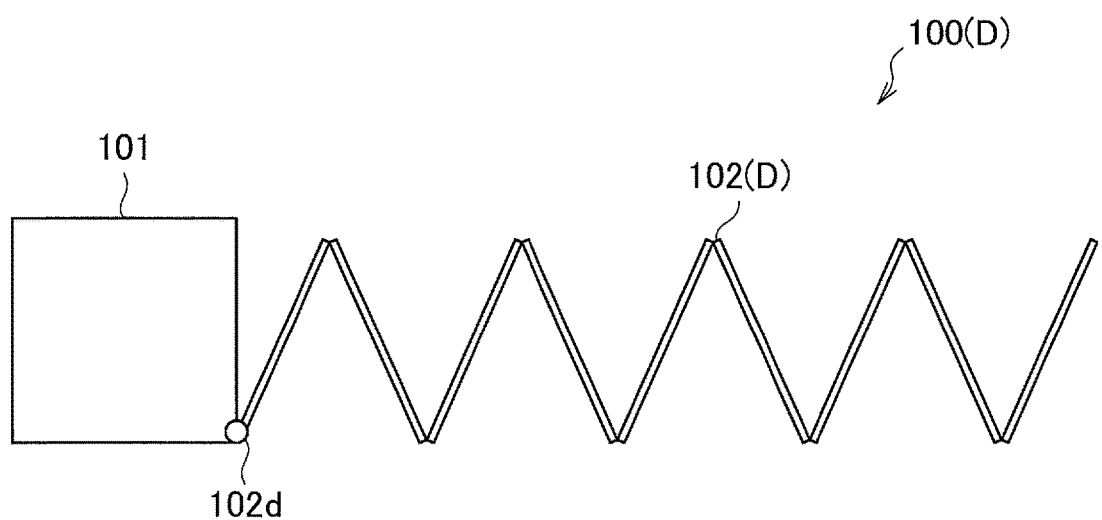
FIG. 6 is an explanatory diagram illustrating another example of a state of the stored display unit of the image shooting device according to the embodiment.

First of all, a schematic configuration of an image shooting device 100 according to a first embodiment of the present disclosure will be described with reference to FIGS. 1 to 6. FIG. 1 is a front view illustrating a configuration example of the image shooting device 100 according to the present embodiment. FIG. 2 is a rear view illustrating a configuration example of the image shooting device 100 according to the present embodiment. FIG. 3 is a rear view illustrating another configuration example of the image shooting device 100 according to the present embodiment. Each of FIGS. 4 to 6 is an explanatory diagram illustrating an example of the state of a stored display unit 102 of the image shooting device 100 according to the present embodiment. FIGS. 4 to 6 each illustrate a relationship between a body 101 and the display unit 102 of the image shooting device 100 seen from an elevated position, and omit a functional unit unnecessary for the description for the sake of clarity.

The image shooting device 100 according to the present embodiment includes an image shooting unit that shoots an image of an object to acquire the image, and the display unit 102 that displays information such as an image and text. For example, as illustrated in FIG. 1, the image shooting device 100 includes, for example, the image shooting unit and the display unit 102 on the cylindrical body 101. Additionally, the shape of the body 101 is not limited thereto, but the body 101 may have another shape such as a cuboid. As illustrated in FIG. 1, the front surface of the body 101 is provided with a lens 103 included in the image shooting unit, and the top of the body 101 is provided with a shutter button 104.

For example, as illustrated in FIG. 2, the back of an image shooting device 100(A) is provided with an operation button 105 that operates the image shooting device 100, a reproduction button 106*a* that reproduces a moving image, a power button 106*b*, and a zoom adjusting dial 107*a* for a zoom adjustment, for example. Alternatively, for example, as illustrated in FIG. 3, the back of an image shooting device 100(B) may also be provided with a focus adjusting dial 107*b* for a focus adjustment, for example, and a shutter speed adjusting dial 107*c* for a shutter speed adjustment.

An image acquired by the image shooting unit is displayed on the display unit 102. The display unit 102 according to the present embodiment is flexible. The display unit 102 is a film-like flexible display that includes, for example, a liquid crystal element and an organic EL element as a light emitting element, and can be flexibly transformed. The display unit 102 can thus be rolled up or folded for storage. An area in the display surface of the display unit 102 pulled out from the body 101 among the display surface of the display unit 102 is referred to as displayable area.

For example, as illustrated in FIG. 4, the display unit 102 can also be smoothly bent and rolled up around a roller 102*a* to be stored in the body 101. Alternatively, when the display unit 102 has a plurality of creases along the roller 102*a* as illustrated in FIG. 5, the display unit 102 may be folded along the creases and wound onto the roller 102A to be stored in the body 101. Meanwhile, when the display unit 102 is formed to be foldable as illustrated in FIG. 6, an end of the display unit 102 may be fixed onto the outer surface of the body 101 in a manner that the display unit 102 can be unfolded and folded using the fixed portion 102d used as a support. In this way, the display unit 102 does not also have to be stored in the body 101.

The image shooting device 100 according to the present embodiment displays, on the basis of the state of the display unit 102 pulled out from the body 101, the corresponding range corresponding to the displayable area of the pulled-out display unit 102 in the entire image range acquired by the image shooting unit. Accordingly, the image shooting device 100 includes a pulled-out state detecting unit that detects the state of the pulled-out display unit 102.

For example, an infrared sensor may be used for the pulled-out state detecting unit in the examples of FIGS. 4 and 5. An infrared sensor 108 is then installed in the body 101 to face the display unit 102 wound onto the roller 102a. The infrared sensor 108 emits an infrared ray to the display unit 102 wound onto the roller 102a, and receives the reflected light of the infrared ray reflected by the display unit 102. The intensity of the reflected light received by the infrared sensor 108 or the time from the emission of an infrared ray to the reception makes it possible to identify how much the display unit 102 has been pulled out from the body 101.

An angle detecting sensor (not illustrated) capable of detecting, for example, the folding angle of each cease on the display unit 102 may be used for the pulled-out state detecting unit in the example of FIG. 6. The folding angles detected by the respective angle detecting sensors make it possible to identify how much the display unit 102 has been pulled out from the body 101.

This image shooting device 100 has, for example, an image shooting mode in which the image shooting unit shoots an image of an image shooting target, and a display mode in which the shot image is displayed on the display unit 102. A user can acquire an image and display the acquired image on the display unit 102 to be confirmed, by switching the image shooting mode and the display mode.

1.2. Functional Configuration of Image Shooting Device

Figure 7:
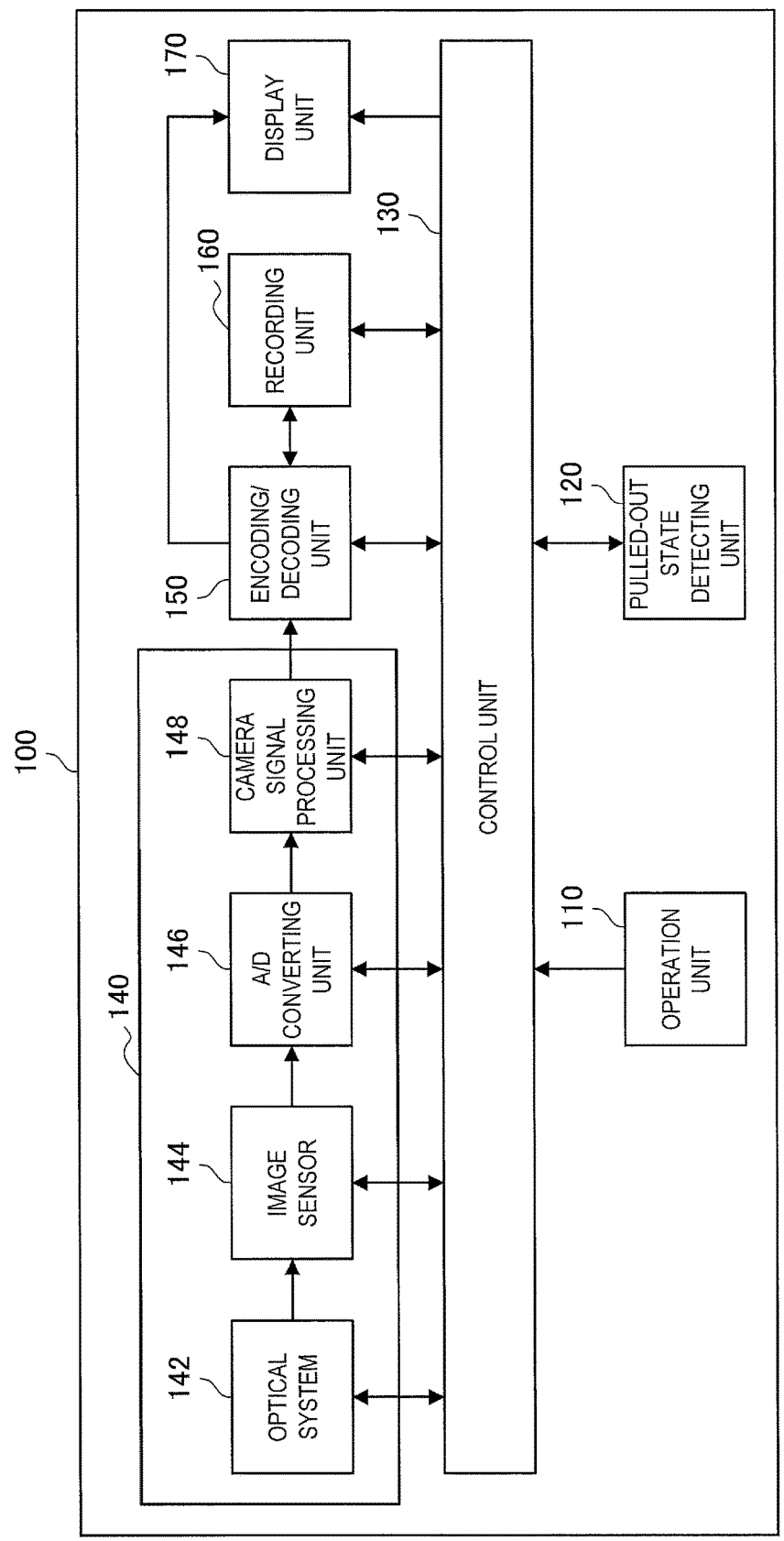
FIG. 7 is a block diagram illustrating a functional configuration of the image shooting device according to the embodiment.

Next, a functional configuration of the image shooting device 100 according to the present embodiment will be described on the basis of FIG. 7. FIG. 7 is a block diagram illustrating a functional configuration of the image shooting device 100 according to the present embodiment. As illustrated in FIG. 7, the image shooting device 100 according to the present embodiment includes an operation unit 110, a pulled-out state detecting unit 120, a control unit 130, an image shooting unit 140, an encoding/decoding unit 150, a recording unit 160, and a display unit 170.

The operation unit 110 is a functional unit for a user to input an operation into the image shooting device 100. The operation unit 110 functions as a reception unit that receives operation information on a user in the image shooting device 100. Examples of the operation unit 110 include the shutter button 104, the operation button 105, the reproduction button 106a, the power button 106b, the zoom adjusting dial 107a, the focus adjusting dial 107b, and the shutter speed adjusting dial 107c as illustrated in FIGS. 1 to 3. Operation input information input from the operation unit 110 is output to the control unit 130.

The pulled-out state detecting unit 120 detects the state of the display unit 102 pulled out from the body 101. Examples of the pulled-out state detecting unit 120 include an infrared sensor and an angle detecting sensor as illustrated in FIGS. 4 and 5. A result of the detection by the pulled-out state detecting unit 120 is output to the control unit 130.

The control unit 130 controls all of the functions of the image shooting device 100. The control unit 130 controls the image shooting unit 140, the recording unit 160, and the display unit 160 on the basis of operation input information from the operation unit 110. In addition, the control unit 130 performs a process of displaying an image to be displayed on the display unit 102 on the basis of a result of the detection by the pulled-out state detecting unit 120. The control unit 130 further instructs the encoding/decoding unit 150 to execute an encoding process or a decoding process on image data acquired by the image shooting unit 140. In addition, the control unit 130 instructs the recording unit 160 to execute a recording process of recording the image data in a recording medium. The control unit 130 controls each process of the image shooting device 100 in this way.

The image shooting unit 140 is a functional unit that acquires an image. The image shooting unit 140 includes an optical system 142, an image sensor 144, an A/D converting unit 146, and a camera signal processing unit 148.

The optical system 142 includes the lens 103 illustrated in FIG. 1, a diaphragm mechanism, and the like, and condenses light incident on the lens 103 to the image sensor 144. The image sensor 144 is an optical sensor that converts the incident optical signal to an electrical signal. For example, a CCD image sensor, a CMOS image sensor, or the like is used for the image sensor 144. The image data converted to an electrical signal by the image sensor 144 is converted from an analog signal to a digital signal by the A/D converting unit 146. The image data converted to a digital signal undergoes image processing performed by the camera signal processing unit 148, and converted to image data of a predetermined image format. The camera signal processing unit 148 is, for example, an integrated circuit for image processing, and performs image processing such as an interpolation operation, a color space conversion, a gamma correction, an aberration correction, a noise reduction, and an image compression.

Although FIG. 7 illustrates that the image shooting unit 140 includes the optical system 142, the image sensor 144, the A/D converting unit 146, and the camera signal processing unit 148, the present technology is not limited to the example. The image shooting unit 140 just includes at least the optical system 142 and the image sensor 144 alone, and the A/D converting unit 146 and the camera signal processing unit 148 may be installed in the image shooting device 100 as functions outside the image shooting unit 140.

Image data acquired by the image shooting unit 140 is output to the encoding/decoding unit 150. The encoding/decoding unit 150 encodes the image data for the recording unit 160 to record the image data in a recording medium. Meanwhile, when the recording unit 160 has a reading function, image data read out from a recording medium is decoded to be output to the display unit 170.

The recording unit 160 records image data in a recording medium. Examples of the recording medium include a memory card and a USB memory having a flash memory built therein. The recording unit 160 may also have a reading function of reading data from a recording medium. Additionally, a disc drive connectable to the image shooting device 100 can record image data in an optical disc such as a CD-R, a CD-RW, a CD-RAM, a DVD-R, a DVD-RW, a DVD-RAM, and a Blu-ray (registered trademark) disc instead of the recording unit 160.

The display unit 170 is a display device that displays image data, and corresponds to the display unit 102 in FIGS. 1 to 3. An image shot by the image shooting unit 140, an image recorded in a recording medium, and the like undergo a display process performed by the control unit 130, and then displayed on the display unit 170.

Once the shutter button 104, which is one of the operation units 110 of the image shooting device 100, is pressed down, incident light from the lens 142 is converted to an electrical signal by a light receiving element 144 and output to the A/D converting unit 146. The electrical signal is converted from an analog signal to a digital signal by the A/D converting unit 146, and then undergoes image processing performed by the camera signal processing unit 148. The image data that undergoes image processing performed by the camera signal processing unit 148 is recorded in a recording medium by the recording unit 160 via the encoding/decoding unit 150, or displayed on the display unit 170. The recording medium records image data having all the ranges of sizes acquired by the image shooting unit 140 irrespective of the size of an image displayable on the display unit 102.

1.3. Overview of Display Process

The display unit 102 of the image shooting device 100 according to the present embodiment is flexible, and rolled up in the body 101 or folded in the body 101 for storage when the display unit 102 is not used as illustrated in FIGS. 4 to 6. To the contrary, when used, the display unit 102 stored in the body 101 is pulled out and unfolded. Only a part of the display unit 102 may be pulled out for use, or all of the display unit 102 may also be pulled out for use. The space of a place where the image shooting device 100 is used, or the size or range of an image that a user would like to display on the display unit 102 changes the amount of the display unit 102 to be pulled out.

The state of the pulled-out display unit 102 changes a display area of an image. When a shot image acquired by the image shooting unit 140 is displayed on the display unit 102, the image shooting device 100 according to the present embodiment uses the state of the display unit 102 pulled out from the body 101 to display the corresponding range of the shot image from the entire range of the image.

Figure 8:
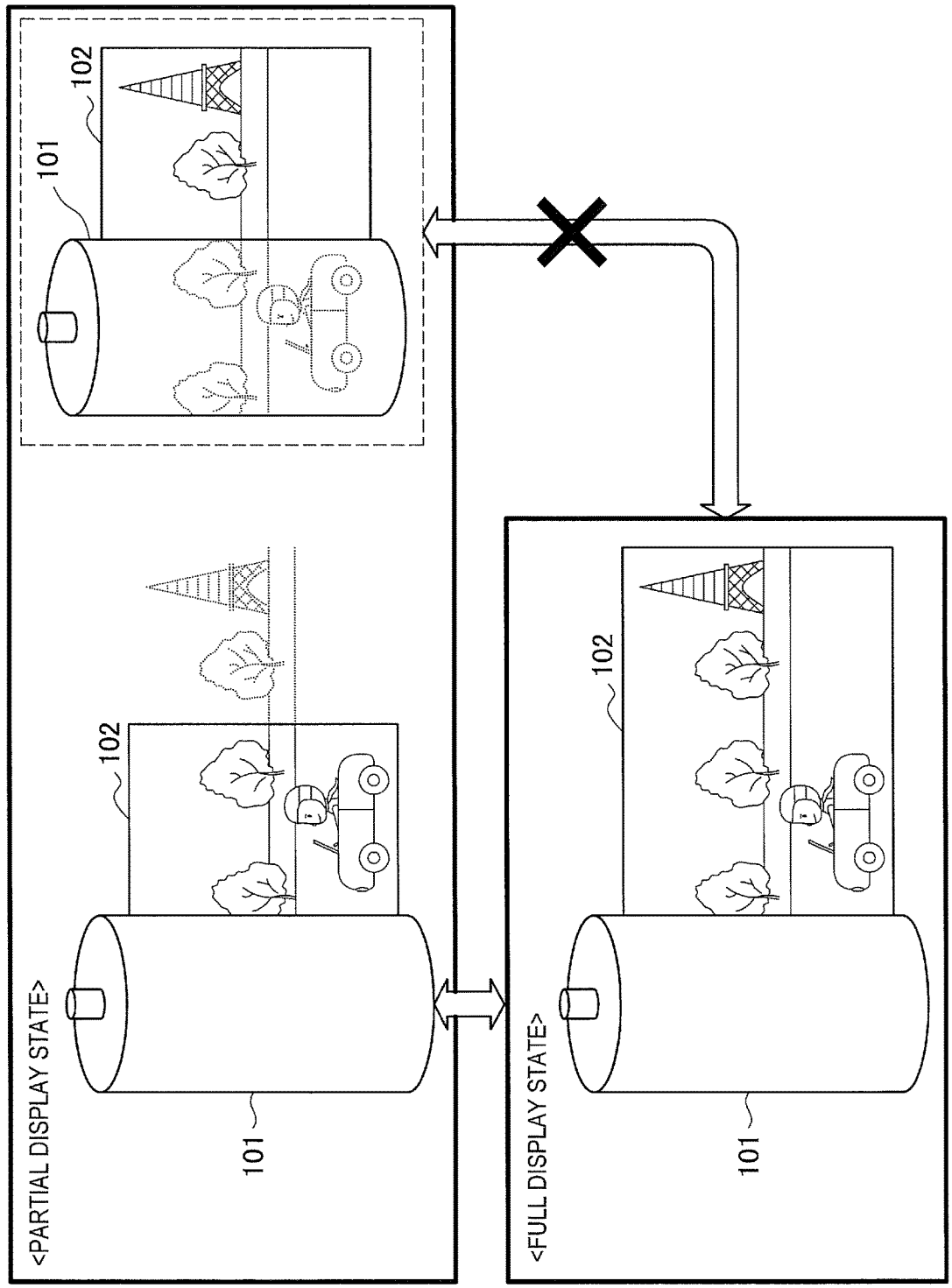
FIG. 8 is an explanatory diagram for describing an image display process on the display unit in accordance with a state of the display unit pulled out from a body.

An image display process on the display unit 102 according to the state of the display unit 102 pulled out from the body 101 will be described on the basis of FIG. 8. The upper part of FIG. 8 illustrates that the display unit 102 is opened halfway and a part of an image is displayed, while the lower part of FIG. 8 illustrates that the entire range of the image is displayed on the display unit 102. In FIG. 8, when the display unit 102 is open to reach a full display state, the display unit 102 displays the entire range of an image shot by the image shooting unit 140. Meanwhile, when the display unit 102 is opened halfway from the body 101, only the left part of the entire range of the shot image is displayed on the display unit 102 as illustrated in the upper left part of FIG. 8.

The pulled-out state detecting unit 120 informs the control unit 130 of the image shooting device 100 that a user has performed an operation of pulling out and opening the display unit 102, and the control unit 130 decides a range to be displayed on the display unit 102 from the entire range of a shot image. According to the present technology, the control unit 130 decides a range to be displayed on the display unit 102 in a manner that the range to be displayed on the display unit 102 is displayed in order from the side of the body 101 with respect to the display unit 102. This allows a shot image to be displayed on the display unit 102 in a manner that the shot image corresponds to an image shooting target which a user is actually looking at.

For example, as illustrated in the upper right part of FIG. 8, when a range to be displayed on the display unit 102 is decided from the entire range of a shot image in a manner that the range to be displayed on the display unit 102 is displayed in order from the end side of the display unit 102 to be pulled out, the shot image displayed on the display unit 102 is moving as the display unit 102 is being pulled out. Since an operation of pulling out or storing the display unit 102 moves a part of a shot image displayed on the display unit 102 in this way, a user has to follow the shot image on the display unit 102 with his or her eyes, resulting in reduced operability. According to the present technology, it is possible to present a shot image on the flexible display unit 102 capable of changing the display area without making users feel strange, so that the operability can be enhanced. A display process performed by the control unit 130 of the image shooting device 100 according to the present embodiment will be described in detail below.

1.4. Display Process Based on State of Pulled-Out Display Unit (1.4.1. Basic Process)

Figure 9:
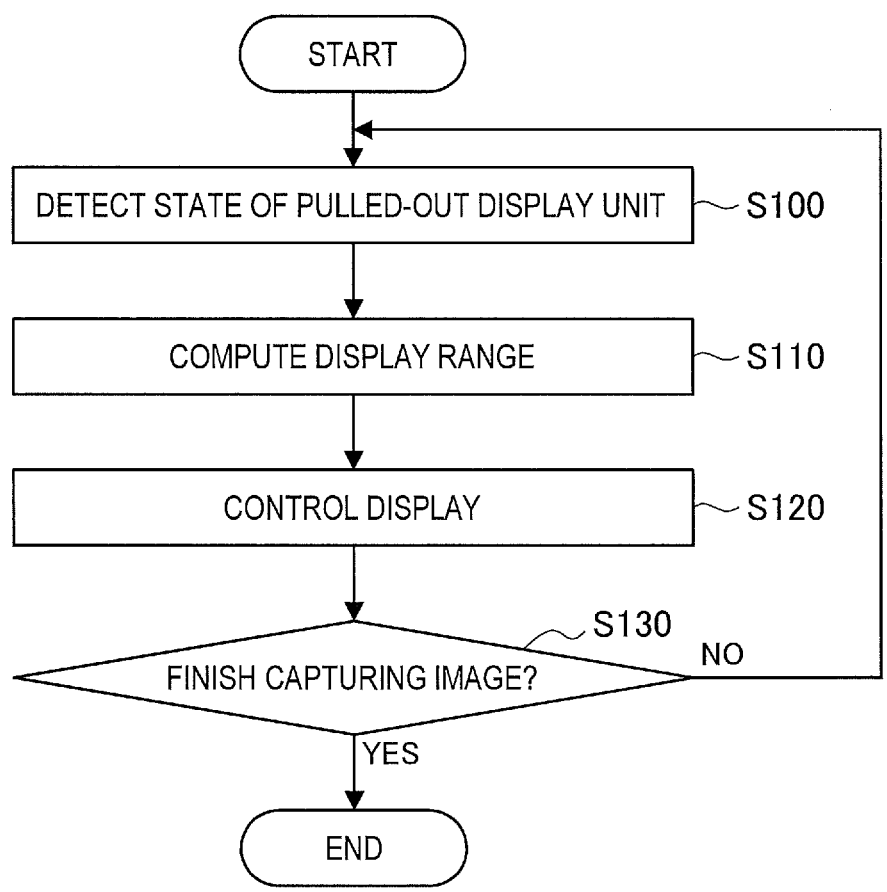
FIG. 9 is a flowchart illustrating a process performed by a control unit to display an image to be displayed on the display unit.
Figure 11:
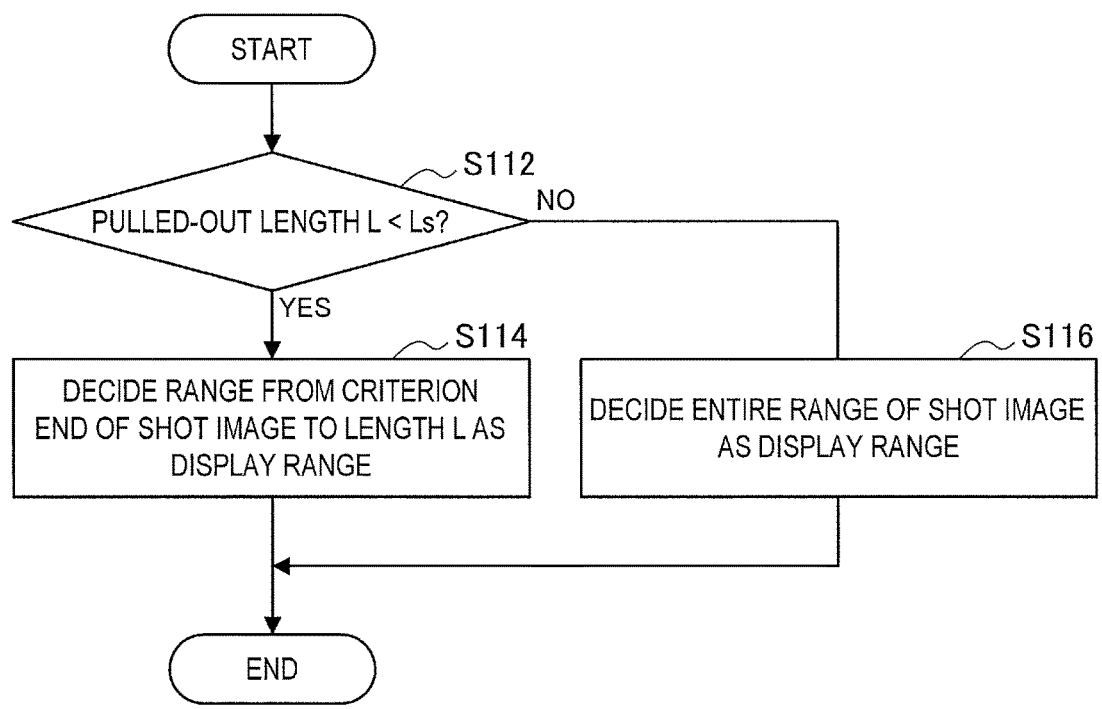
FIG. 11 is a flowchart illustrating a process of deciding a display range of a shot image.

A basic flow of a process performed by the control unit 130 to display an image to be displayed on the display unit 102 will be shown on the basis of FIGS. 9 to 11. FIG. 9 is a flowchart illustrating a display process performed by the control unit 130 according to the present embodiment. FIG. 10 is an explanatory diagram for describing a range of a shot image displayed on the display unit 102, the range changing in accordance with the state of the display unit 102 pulled out from the body 101. FIG. 11 is a flowchart illustrating a process of deciding a display range of a shot image.

A process of displaying an image according to the present embodiment is started, for example, when the power button 106b is pressed down and the image shooting device 100 is functionally started in the image shooting mode. First, the image shooting device 100 detects the state of the pulled-out display unit 102 by using the pulled-out state detecting unit 120 as illustrated in FIG. 9 (S100). As discussed above, for example, the infrared sensor 108 and an angle detecting sensor can be used for the pulled-out state detecting unit 120. The pulled-out state detecting unit 120 outputs a result of the detection to the control unit 130.

The control unit 130 identifies how much the display unit 102 has been pulled out from the body 101, on the basis of the result of the detection by the pulled-out state detecting unit 120. For example, when the infrared sensor 108 is used for the pulled-out state detecting unit 120, the intensity of the reflected light received by the sensor or the time from the emission of an infrared ray to the reception can identify the state of the pulled-out display unit 102. Meanwhile, when angle detecting sensors are used for the pulled-out state detecting unit 120, folding angles detected by the respective angle detecting sensors can identify the state of the pulled-out display unit 102.

The state of the pulled-out display unit 102 is represented by a length (which is the length of the amount of the pulled-out display unit 102 and will also be referred to as "pulled-out length" below) L of the display unit 102 pulled out from the body 101 in a pulling-out direction. The pulled-out length L may range from a value of 0 (the fully closed display unit 102) to a value of a length $L_{max}$ of the display unit 102 in the pulling-out direction.

The control unit 130 calculate the range of a shot image to be displayed on the display unit 102 on the basis of the pulled-out length L of the display unit 102 (S110). The entire range of a shot image acquired by the image shooting unit 140 is decided in accordance with the angle of view a of the lens 103 or the performance of the image sensor 144. The minimum value of the pulled-out length L of the display unit 102 which allows the display unit 102 to display the entire range of a shot image is referred to as full display pulled-out length Ls. This state is referred to as full display state. For example, as illustrated in FIG. 10, the display unit 102 displays the entire range of a shot image 202 in the full display state. Meanwhile, when the pulled-out length L of the display unit 102 is less than the full display pulled-out length Ls, the corresponding range, which is a part of the entire range of the shot image 202, is displayed.

First, the control unit 130 determines whether or not the pulled-out length L of the display unit 102 from the body 102 is less than the full display pulled-out length Ls as illustrated in FIG. 11 (S112). If the pulled-out length L is less than the full display pulled-out length Ls, the control unit 130 decides the range of the shot image 202 from a criterion end to the length L in the pulling-out direction as a range to be displayed on the display unit 102 (S114). The criterion end is the border between the displayable area of the display unit 102 pulled out from the body 101 and the body 101. The left end of the displayable area of the display unit 102 is set as the criterion end in the example of FIG. 10.

The control unit 130 decides the range from the left side of the shot image 202 to the length L as a display range. To the contrary, when the pulled-out length L is greater than or equal to the full display pulled-out length Ls, the control unit 130 decides the entire range of the shot image 202 as a range to be displayed on the display unit 102 (S116). A range of the shot image 202 to be displayed on the display unit 102 is decided in this way.

The description returns to FIG. 9. Once the display range of the shot image 202 is decided in step S110, the control unit 130 exerts control in a manner that the decided display range is displayed on the displayable area of the display unit 102 (S120). The control unit 130 then displays the display range of the shot image 202 from the side of the criterion end (left end in the example of FIG. 10) of the display unit 102. This allows a user to look at the shot image 202 displayed on the display unit 102 in the relationship corresponding to that of an image shooting target which the user is looking at without moving the image displayed on the display unit 102 in the pulling-out direction.

For example, an image shooting range included in the angle of view of the lens 103 is divided into a left range S1 and a right range S2 in FIG. 10. The display unit 102 then displays the entire range of the shot image 202 in the full display state. Meanwhile, the display unit 102 displays the shot image 102 by the pulled-out length L from the image shooting range S1 on the side of the criterion end in the partial display state. Even when only a part of the shot image is displayed on the display unit 102, the left range S1 of the image shooting range is displayed from the left side of the displayable area of the display unit 102 in this way.

Once the shot image 202 is displayed on the display unit 102 through the display process in step S120, the control unit 130 determines whether or not an instruction for finishing capturing an image is input by a user (S130). For example, when the power source is turned off, the image shooting mode is switched to the display mode, or the like, it may be determined that an instruction for finishing capturing an image is issued. When an instruction for finishing capturing an image is input, the control unit 130 finishes the display process in FIG. 9. To the contrary, when no instruction for finishing capturing an image is input, the control unit 130 repeatedly executes the processes from step S100.

(1.4.2. Display Process on Extended Area of Display Unit)
(a) Use of Extended Area As discussed above, the control unit 130 of the image shooting device 100 decides the display range of the shot image 202 in accordance with whether or not the pulled-out length L of the display unit 102 is greater than or equal to the full display pulled-out length Ls. Here, the length $L_{max}$ of the display unit 102 in the pulling-out direction is greater than the full display pulled-out length Ls in some cases. When the pulled-out length L exceeds the full display pulled-out length Ls, the control unit 130 may display information other than the shot image 202 on the exceeding part, for example.

For example, let us assume that the display unit 102, which has been pulled out to reach the full display state, is further pulled out as illustrated in FIG. 12. That is to say, the pulled-out length L of the display unit 102 is greater than the full display pulled-out length Ls. This state is referred to as extension state. When the display unit 102 of the image shooting device 100 is in the extension state, the control unit 130 displays the entire range of the shot image 202 on an area A (i.e. body side area which will also be referred to as "shot image area A" below) from the side of the criterion end of the display unit 102 to the full display pulled-out length Ls.

Furthermore, information other than the shot image 202 is displayed on an area B (i.e. pulled-out side area which will also be referred to as "extended area B" below) from the full display pulled-out length Ls to the pulled-out length L in the displayable area of the display unit 102. The length of the extended area B in the pulling-out direction is referred to as La. The length La is a difference between the pulled-out length L and the full display pulled-out length Ls. For example, a captured image 204 may be displayed on the extended area B.

When the display unit 102 is in the extension state in this way, other information such as the captured image 204 is displayed on the display unit 102 along with the shot image 202, thereby allowing a user to capture an image that has already been shot while confirming the image.

When the display unit 102 is in the extension state, information to be displayed on the extended area B of the display unit 102 is not limited to the captured image 204. For example, as illustrated in the upper part of FIG. 13, image capturing information 206 on the captured image 204 may also be displayed on the extended area B along with the captured image 204. Examples of the image capturing information 206 include image capturing date and time, ISO, and diaphragm setting. When the display unit 102 is further pulled out from the display unit 102 as illustrated in the upper part of FIG. 13 to unfold the extended area B, the captured image 204 displayed on the extended area B may be enlarged as illustrated, for example, in the middle of FIG. 13.

Figure 13:
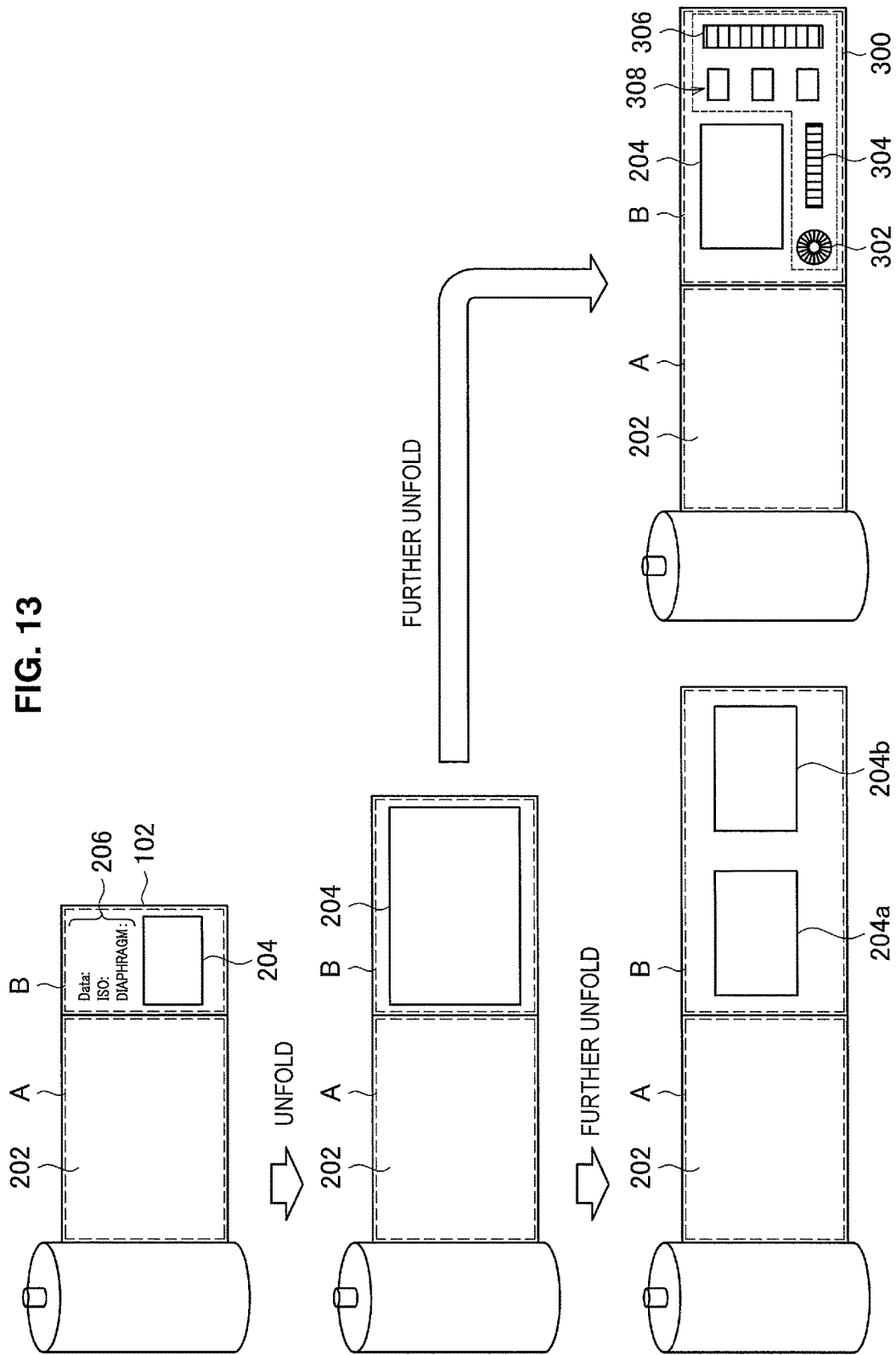
FIG. 13 is an explanatory diagram illustrating another example of information displayed on the display unit in an extension state.

When the display unit 102 is further pulled out from the display unit 102 as illustrated in the middle of FIG. 13 to unfold the extended area B, a plurality of captured images 204 (such as two captured images 204a and 204b) may be displayed on the extended area B as illustrated, for example, in the lower left part of FIG. 13. Alternatively, an operation input unit 300 for inputting an image capturing control operation of the image shooting unit 140 may also be displayed along with the captured image 204 as illustrated in the lower right part of FIG. 13. The display unit 102 is then provided with a touch panel capable of detecting that an operation object such as a finger comes into contact or is approaching.

The operation input unit 300 includes, for example, a circular dial operation unit 302, a horizontal dial operation unit 304, a vertical dial operation unit 306, and an operation button 308. The operation input unit 300 has to include at least one operation unit, and may also include a plurality of operation units as illustrated in the lower right part of FIG. 13. For example, the functions of the shutter button 104, the reproduction button 106a, the zoom adjusting dial 107a, the focus adjusting dial 107b, the shutter speed adjusting dial 107c, and the like installed on the body 101 may be assigned to each operation unit of the operation input unit 300.

(b) Enlargement of Captured Image Displayed on Extended Area

Let us assume that the display unit 102 is in the extension state, and the shot image 202 and the captured image 204 are displayed on the display unit 102 as illustrated in the upper part of FIG. 14. If a user performs an operation of selecting the captured image 204 at this time, the captured image 204 may be enlarged as illustrated in the lower part of FIG. 14. The captured image 204 is selected, for example, via the operation unit 110 installed on the body 101. Alternatively, if the display unit 102 includes a touch panel, a user can also select the captured image 204 by directly touching the captured image 204 or making an operation input with the operation input unit 300 installed in the extended area B.

The enlarged captured image 204 may also be displayed on the shot image area A beyond the extended area B. The shot image 202 may be reduced in size in a manner that even the enlarged captured image 204 can be still visually recognized.

(c) Display Information on Extended Area while Moving Image is being Captured

The image shooting device 100 according to the present embodiment may be capable of capturing not only a still image, but also a moving image. While a moving image is being captured, the control unit 130 may display a moving image 208 that is being captured on the shot image area A of the display unit 102 and display, on the extended area B, a still image recorded while the moving image is being captured as illustrated, for example, in FIG. 15.

That is to say, if a user presses down, for example, the shutter button 104 while capturing a moving image in the image shooting mode, an image at the time at which the shutter button 104 is pressed down is acquired as a still image. Image capturing time 211 and a time axis 212 of the moving image may be then displayed on the extended area B. Still images 214a to 214c acquired while the moving image is being captured may be displayed in association with positions on the time axis 212 corresponding to time at which the still images 214a to 214c were acquired. This allows a user to recognize when a still image was acquired and what still image was acquired while the moving image is being captured.

Figure 15:
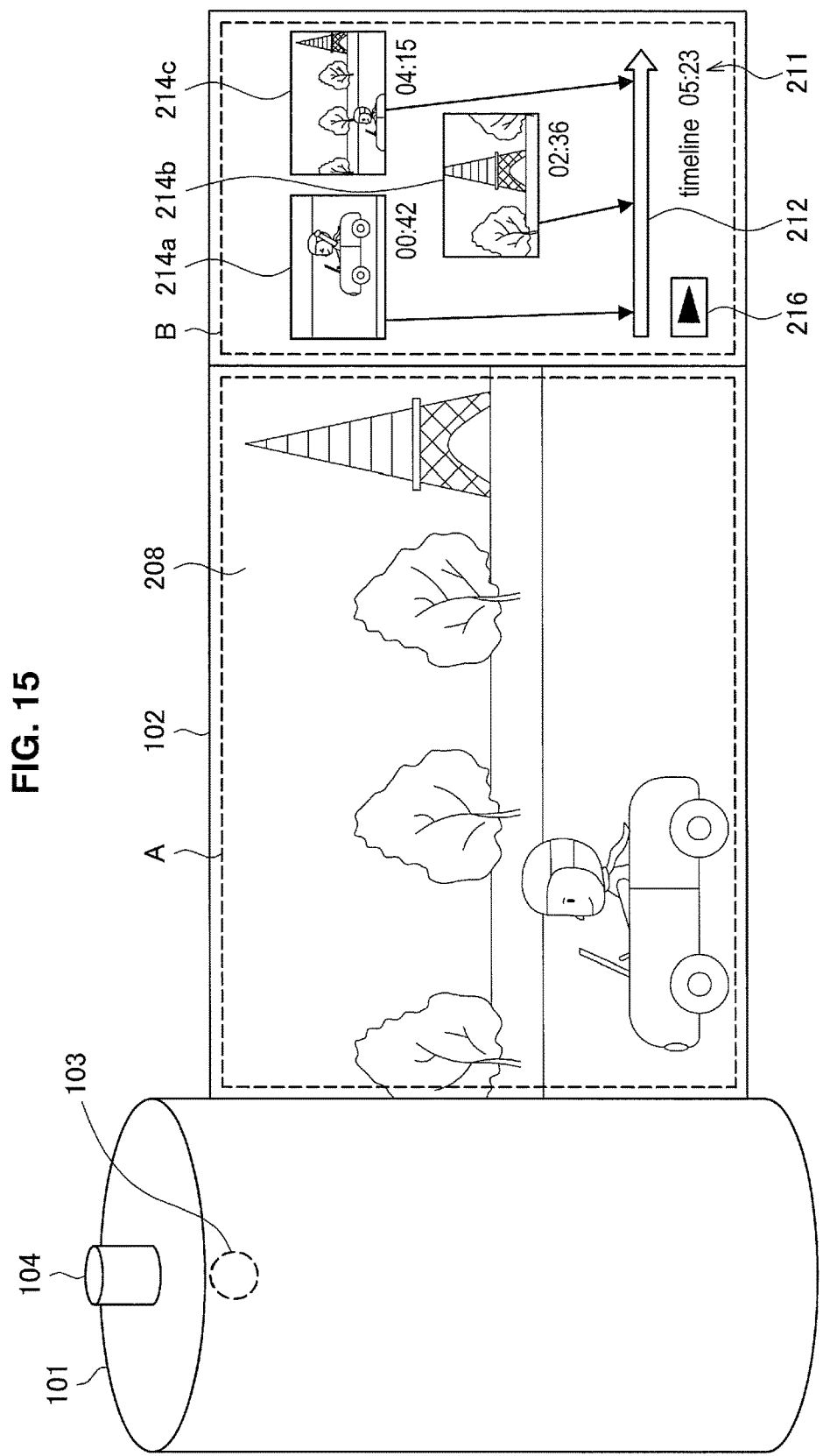
FIG. 15 is an explanatory diagram illustrating an example in which a still image acquired while a moving image is being captured is displayed on the extended area.

The reproduction button 216 for reproducing the moving image may also be installed in the extended area B. If a moving image is being recorded, touching the reproduction button 216 may cause the moving image that is being recorded to be reproduced in a time shifted manner. If a moving image has already been recorded, touching the reproduction button 216 may cause the recorded moving image to be reproduced. A still image selected from the still images 214a to 214c displayed on the extended area B as illustrated in FIG. 15 may be enlarged as described on the basis of FIG. 14. A moving image to be reproduced and a still image to be enlarged may be displayed within the extended area B, or may also be displayed on the whole or a part of the displayable area including the shot image area A.

The configuration of the image shooting device 100 according to the first embodiment and the display control exerted by the control unit 130 of the image shooting device 100 have been described so far. The image shooting device 100 according to the present embodiment includes the flexible display unit 102. The control unit 130 exerts control in a manner that the display unit 102 displays the entire range of the shot image 202 when the display unit 102 is in the full display state. Meanwhile, the control unit 130 exerts control in a manner that the display unit 102 displays the range of the shot image 202 from the criterion end to the pulled-out length L in the pulling-out direction when the display unit 102 is in the partial display state. This makes it possible to display the shot image 202 on the display unit 102 in accordance with the intention of a user, to present a shot image on the display unit 102 without making the user feel strange, and to enhance the operability.

2. Second Embodiment

Figure 16:
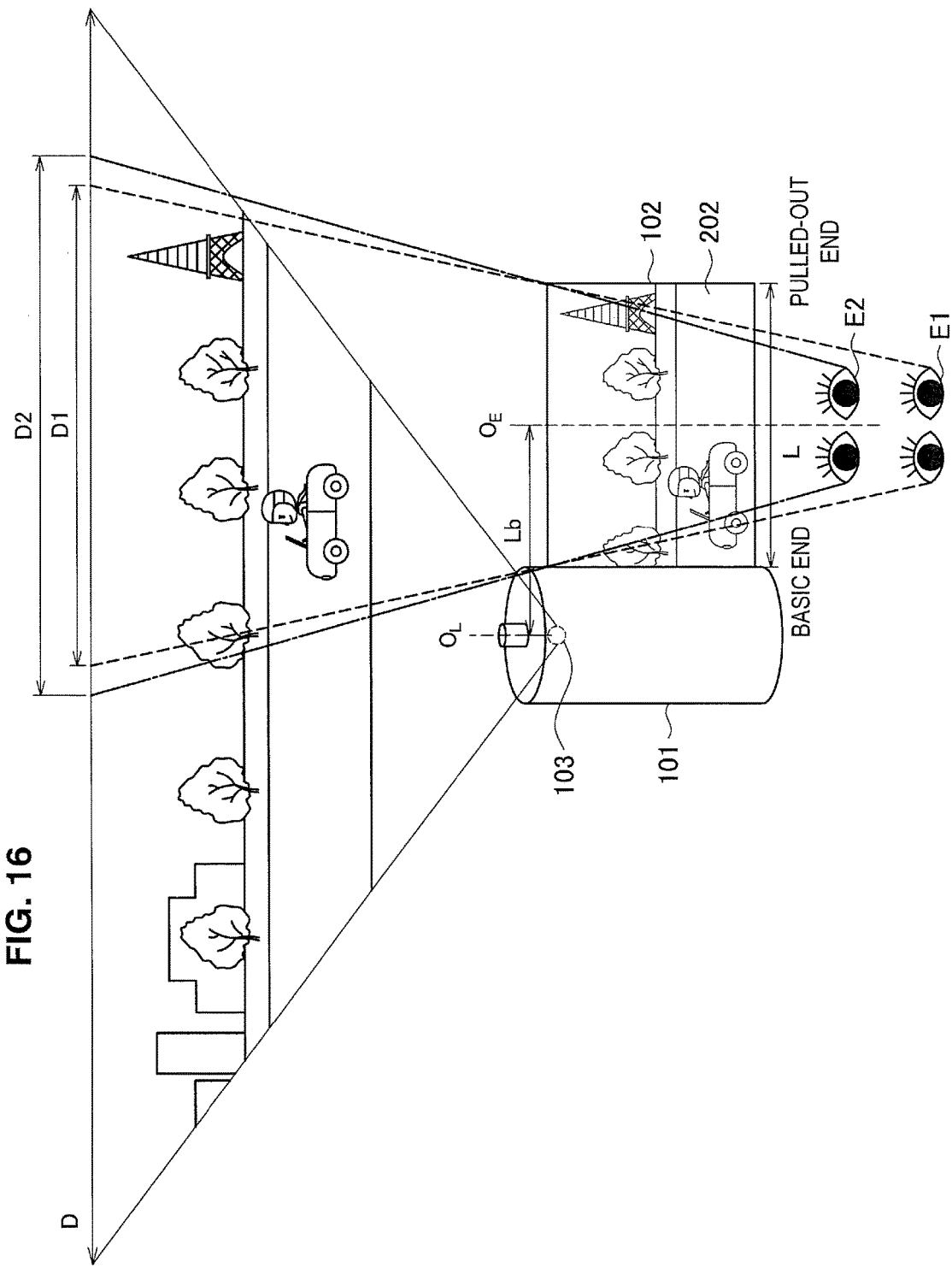
FIG. 16 is an explanatory diagram for describing a display process performed by a control unit according to a second embodiment of the present disclosure.
Figure 17:
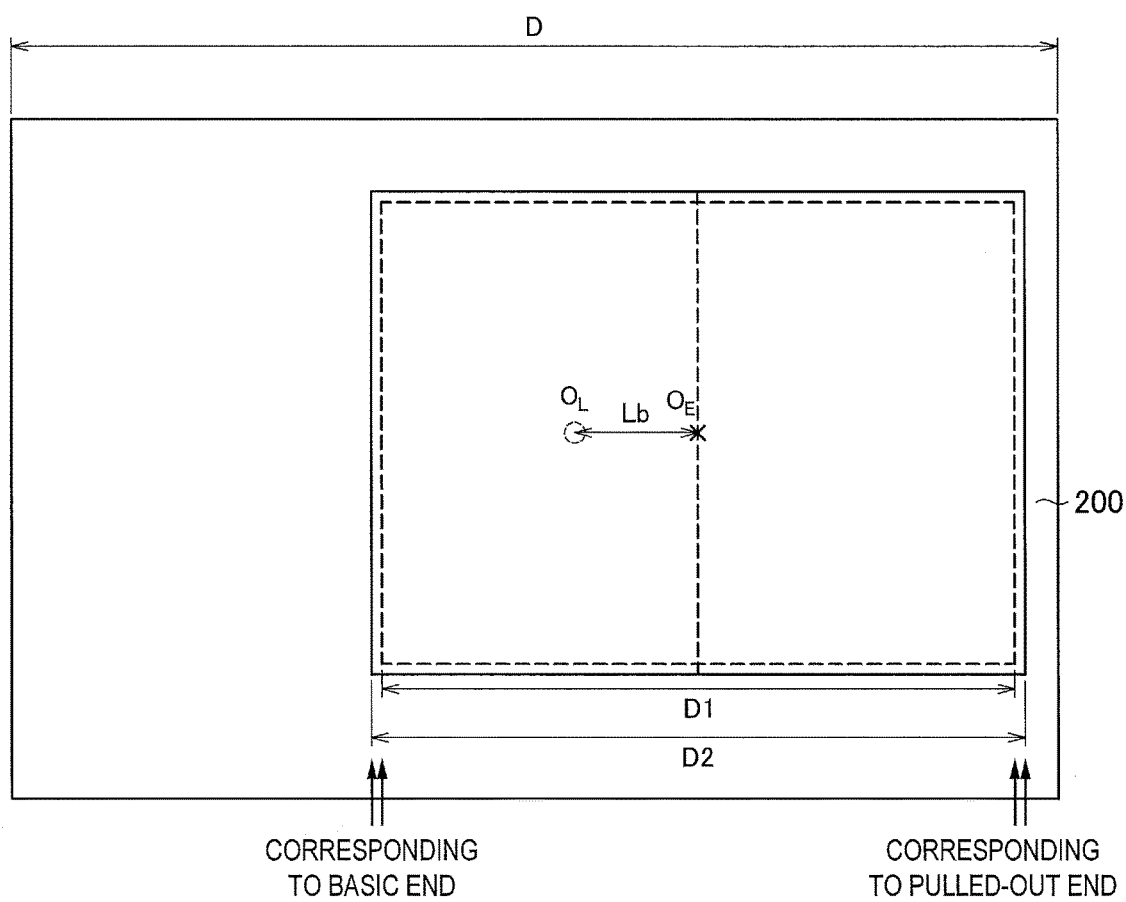
FIG. 17 is an explanatory diagram for describing a method for deciding a display range of a shot image in accordance with a focal distance of an eye of a user.

Next, display control exerted by the control unit 130 of the image shooting device 100 according to a second embodiment of the present disclosure will be described with reference to FIGS. 16 and 17. FIG. 16 is an explanatory diagram for describing a display process performed by the control unit 130 according to the present embodiment. FIG. 17 is an explanatory diagram for describing a method for deciding a display range of the shot image 202 in accordance with a focal distance of an eye of a user. Since the configuration and function of the image shooting device 100 are the same as those of the first embodiment in the present embodiment, the description of them will be omitted here.

The control unit 130 performs a display process of displaying the shot image 202 on the display unit 102 in accordance with a focal distance of the eyes of a user in the present embodiment. For example, when a user is looking at the display unit 102 from a position E1 as illustrated in FIG. 16, the display unit 102 displays an image shooting target ahead of the gaze of the user. Displaying the shot image 202 on the display unit 102 in this way allows a user to look at the shot image 202 displayed on the display unit 102 in a see-through manner.

The control unit 130 decides a display range of the shot image 202 on the basis of a focal distance of the eyes of a user and the state of the display unit 102 pulled out from the body 101 in the present embodiment. It is assumed that the distance between the position E1 of the eyes of a user and the display unit 102 is substantially constant. Then, the distance is set as a focal distance (e.g. approximately 50 mm) of the eyes of a general person.

First of all, the control unit 130 acquires the pulled-out length L of the display unit 102, and then calculates a central position $O_E$ in the displayable area of the display unit 102 in the pulling-out direction. The central position $O_E$ is the middle position of the pulled-out length L. Let us here suppose that the lens 103 are located at the position of the eyes of a user at the central position $O_E$. That is to say, the lens 103 is located at the position apart from an actual position $O_L$ of the lens 103 of the image shooting device 100 toward the display unit 102 by a distance Lb.

When it is supposed that the lens 103 is located at the central position $O_E$, the control unit 130 sets, as the display range, the range of the shot image 202 to be cut out in accordance with the set focal distance of the eyes of a user. This display process identifies, as the display range, the range of an image shooting target ahead of the gaze of a user looking at the display unit 102 from the entire range 200 of the shot image 202 illustrated in FIG. 17. Additionally, a length D represents the length within the entire range 200 of the shot image 202 in the pulling-out direction in FIGS. 16 and 17.

When the image shooting device 100 includes a detection sensor (not illustrated) that detects the distance from the display unit 102 to the position of the eyes of a user, a distance detected by the detection sensor may also be used as a focal distance of the eyes of the user. The focal distance of the eyes of the user can be then made variable, so that it is possible to change the range of the shot image 202 to be displayed on the displayable area of the display unit 102 in accordance with this focal distance.

The shot image 202 displayed on the display unit 102 will be described as seen from eyes at the position E1 of the eyes of a user and a position E2 closer to the display unit 102 than the position E1 as illustrated, for example, in FIG. 16. As illustrated in FIG. 16, the shot image 202 displayed when the eyes of a user are located at the position E2 with a shorter focal distance shows a wider range than the shot image 202 displayed when the eyes of a user are located at the position E1. In this way, changing the display range of the shot image 202 in accordance with the position of the eyes of a user allows a user to look at the shot image 202 as if the user saw through an image shooting target more.

The display control exerted by the control unit 130 of the image shooting device 100 according to the second embodiment has been described so far. The control unit 130 displays the shot image 202 on the display unit 102 in accordance with a focal distance of the eyes of a user in the present embodiment. This makes it possible to display, on the display unit 102, the shot image 202 according to the intention of a user which corresponds to an image shooting target ahead of the gaze of the user looking at the display unit 102, and to present the shot image 202 on the display unit 102 without making the user feel strange.

3. Third Embodiment

Next, display control exerted by the control unit 130 of the image shooting device 100 according to a third embodiment of the present disclosure will be described with reference to FIGS. 18 to 22. Each of FIGS. 18 to 22 is an explanatory diagram for describing a display process performed by the control unit 130 according to the present embodiment. The image shooting device 100 according to the present embodiment is different from that of the first embodiment in that the image shooting device 100 according to the present embodiment includes two image shooting units 140. The other configuration and function of the image processing device 100 are the same as those of the first embodiment, the description of them will be omitted here.

Figure 18:
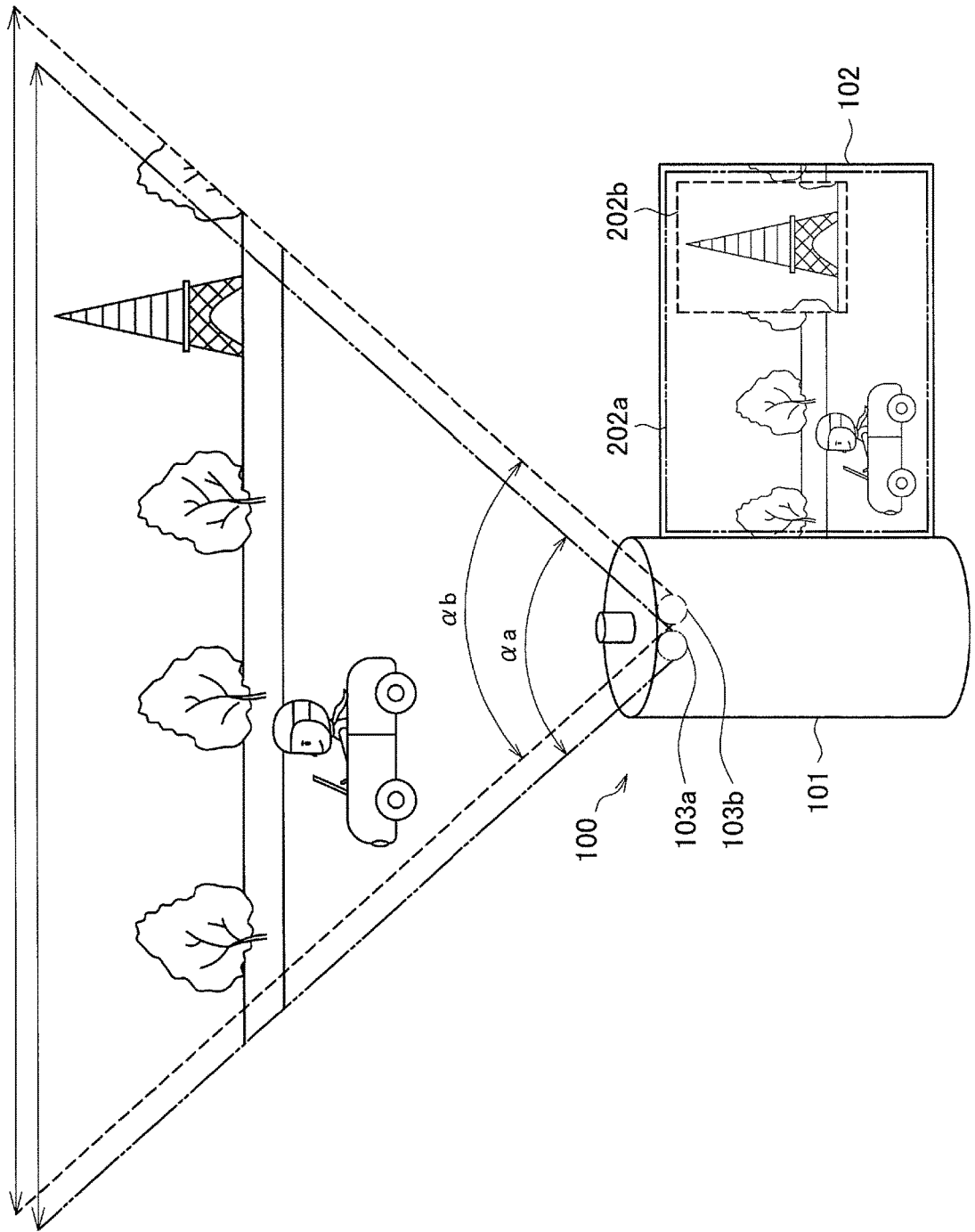
FIG. 18 is an explanatory diagram for describing a display process performed by a control unit in an image shooting device according to a third embodiment of the present disclosure which includes two lenses.

The image shooting device 100 according to the present embodiment includes two lenses (such as a first lens 103a and a second lens 103b) as illustrated in FIG. 18. Each lens 103 is installed as an optical system 142 for a different image shooting unit 140. For example, the first lens 103a and the second lens 103b may be installed, for example, as any one of a wide-angle lens, a telephoto lens, and a zoom lens. The first lens 103a and the second lens 103b acquire shot images 202a and 202b within the ranges according to an angle of view $\alpha a$, and an angle of view $\alpha b$, respectively.

Figure 19:
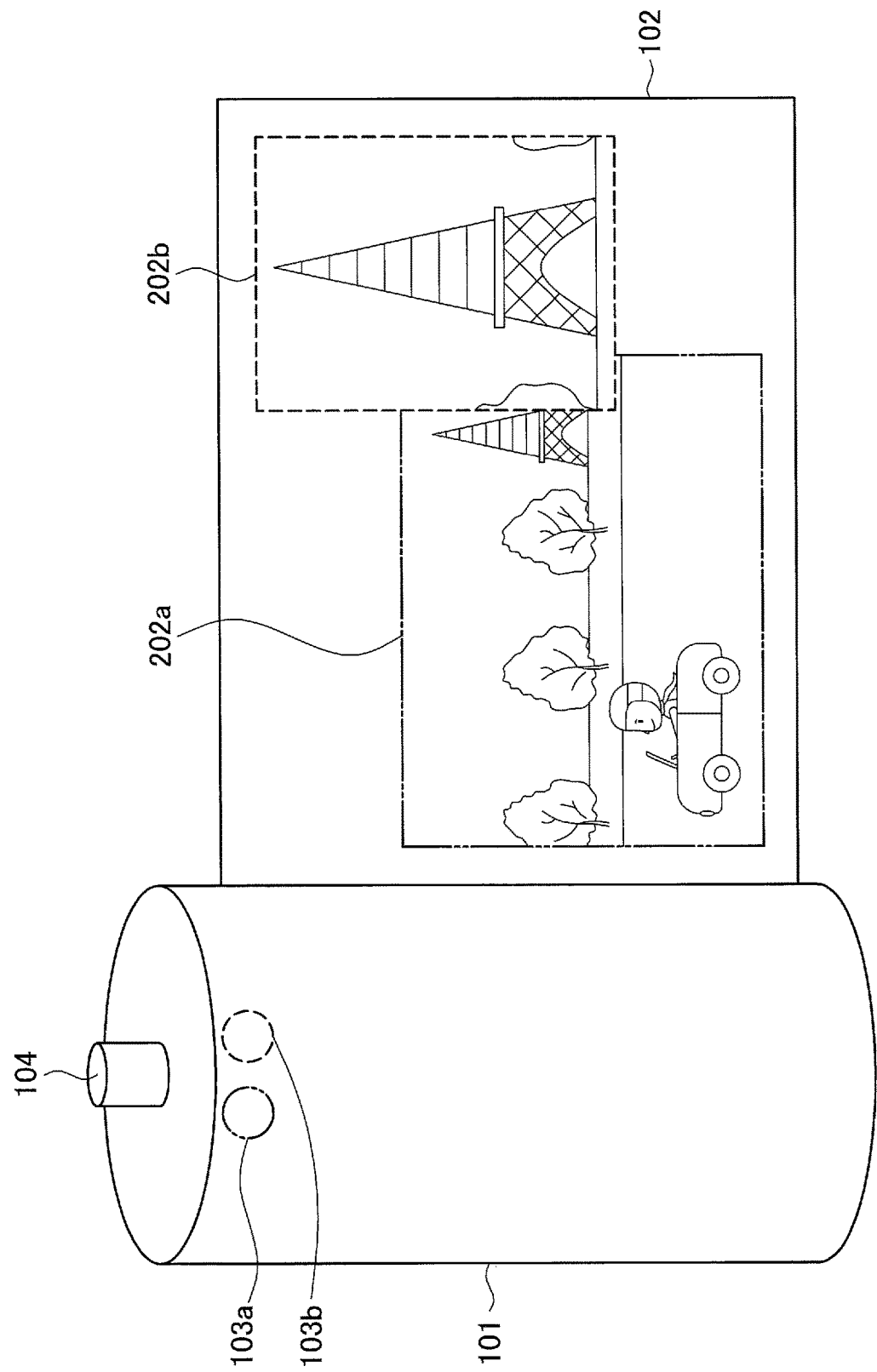
FIG. 19 is an explanatory diagram for describing another display process performed by the control unit in the image shooting device according to the embodiment.

The control unit 130 displays, on the displayable area of the display unit 102, the shot images 202a and 202b acquired by the image shooting units 140 corresponding to the lenses 103a and 103b, respectively. The control unit 130 may display the first shot image 202a on the entire displayable area of the display unit 102, and may superimpose the second shot image 202b smaller than the first shot image 202a on the first shot image 202a as illustrated, for example, in FIG. 18. Alternatively, the control unit 130 may display the first shot image 202a and the second shot image 202b on the display unit 102 at substantially the same size as illustrated in FIG. 19.

Figure 20:
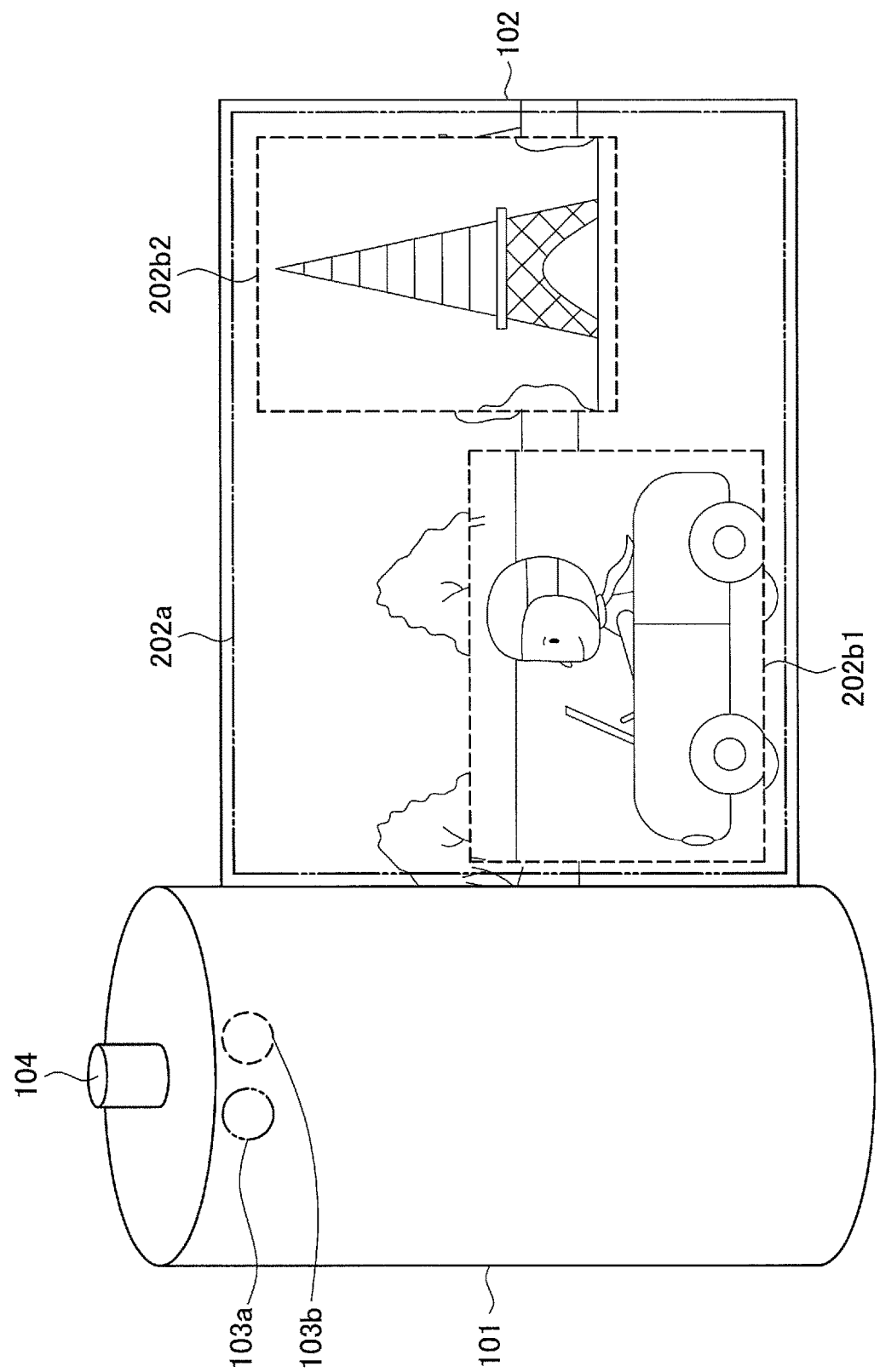
FIG. 20 is an explanatory diagram for describing another display process performed by the control unit in the image shooting device according to the embodiment.

Alternatively, the control unit 130 may display the first shot image 202a acquired by the first lens 103 on the entire displayable area of the display unit 102, and may superimpose first shot images 202b1 and 202b2 acquired by the second lens 103b on the first shot image 202a as illustrated in FIG. 20. A plurality of second shot images 202b1 and 202b2 illustrated in FIG. 20 are captured by the image shooting unit 104 corresponding to the second lens 103b at different image capturing time. The control unit 130 then exerts display control in a manner that each of the second shot images 202b1 and 202b2 is displayed at the position corresponding to the first shot image 202a. This can show a user a relationship between the shot images 202a, 202b1, and 202b2 shot by the respective lenses 103a and 103b.

When performing such a display process, the control unit 130 performs a display process according to the state of the pulled-out display unit 102 as described in the first embodiment or the second embodiment to perform a process of displaying at least any one of the first shot image 202a and the second shot image 202b. This makes it possible to present the shot images 202a and 202b that have undergone a display process according to the state of the pulled-out display unit 102 without making a user feel strange.

Figure 21:
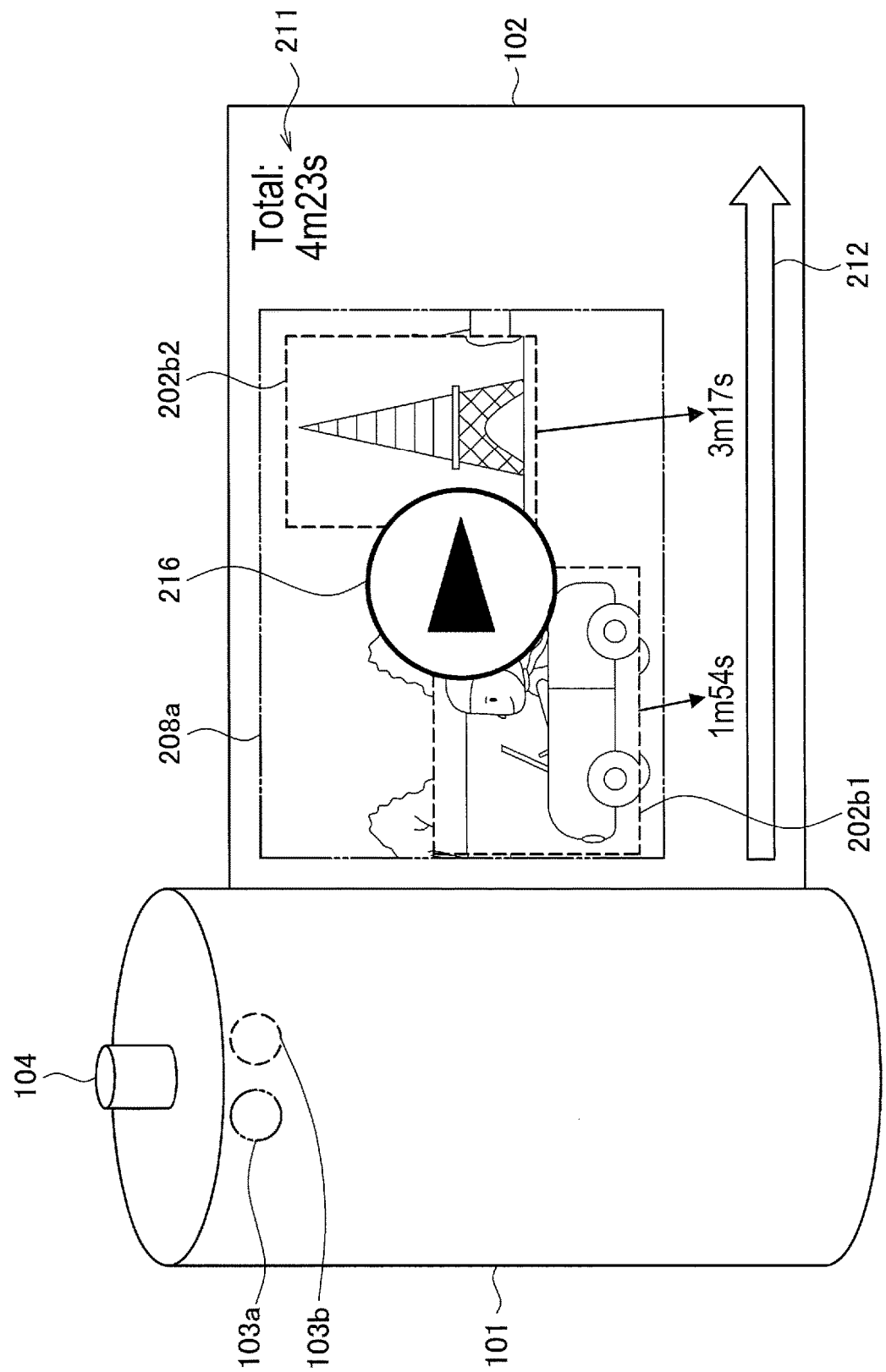
FIG. 21 is an explanatory diagram for describing another display process performed by the control unit in the image shooting device according to the embodiment.

The same applies to a moving image used as a shot image, and the control unit 130 displays an image shot by each of the lenses 103a and 103b on the displayable area of the display unit 102. For example, let us assume in the example of FIG. 21 that the image shooting unit 140 corresponding to the first lens 103a acquires a moving image and the image shooting unit 140 corresponding to the second lens 103b acquires a still image. Once the first lens 103a begins to capture a moving image, a moving image 208a is displayed on the displayable area of the display unit 102 as illustrated in FIG. 21. The image capturing time 211 and time axis 212 of the moving image 208a may also be displayed within the displayable area.

Once the shutter button 104 is pressed down while a moving image is being captured, the second lens 103b acquires still images 202b1 and 202b2. The control unit 130 may display these still images 202b1 and 202b2 in association with positions on the time axis 212 corresponding to time at which the still images 202b1 and 202b2 were acquired. This allows a user to recognize when a still image was acquired and what still image was acquired while the moving image is being captured.

The reproduction button 216 for reproducing the moving image 208a may also be installed in the displayable area. If a moving image is being recorded, touching the reproduction button 216 may cause the moving image that is being recorded to be reproduced in a time shifted manner. If a moving image has already been recorded, touching the reproduction button 216 may cause the recorded moving image to be reproduced. Furthermore, a still image selected from the still images 202b1 and 202b2 displayed on the displayable area may be enlarged as described in FIG. 15.

Alternatively, when the moving image 208a is reproduced and displayed on the displayable area, the moving image 208a may be displayed on the entire displayable area and the still image 202b may be displayed at the timing at which reproduction time arrives at still image acquisition time as illustrated in FIG. 22.

For example, the moving image 208a is displayed on the displayable area of the display unit 102 as illustrated in the upper part of FIG. 22. The image capturing time 211 and time axis 212 of the moving image 208a may also be displayed within the displayable area. A reproduction pointer 217 that indicates a time point which is currently being reproduced and a still image acquisition pointer 218 that indicates a time point at which the still image 202b shot by the second lens 103b was recorded may also be displayed on the time axis 212. The reproduction pointer 217 moves on the time axis 212 in accordance with the reproduction time. A plurality of still image acquisition pointers 218 may also be displayed in accordance with the number of acquired still images 202b.

When the moving image 208a is reproduced and the reproduction time arrives at the acquisition time of the still image 202b, the still image 202b is displayed on at least a part of the displayable area as illustrated in the lower part of FIG. 22. The display position of the still image 202b is not limited in particular, but it is desirable to display the still image 202b on a part of the currently reproduced moving image 208a where no characteristic image shooting target such as a person or a building is displayed. The displayed still image 202b disappears at predetermined timing. The still image 202b may disappear, for example, when predetermined time (such as a few seconds) is elapsed from the display time point, before the reproduction time of the moving image 208a arrives at a time point at which a next still image 202 is acquired, or the like.

The display control exerted by the control unit 130 of the image shooting device 100 according to the third embodiment has been described so far. Even when the two lenses 103a and 103b are included as in the present embodiment, a display process according to the state of the pulled-out display unit 102 is performed as in the above-described embodiments. This makes it possible to display the shot image 202 on the display unit 102 in accordance with the intention of a user, and to present the shot image 202 that has undergone a display process according to the state of the pulled-out display unit 102 without making the user feel strange.

4. Fourth Embodiment

Figure 23:
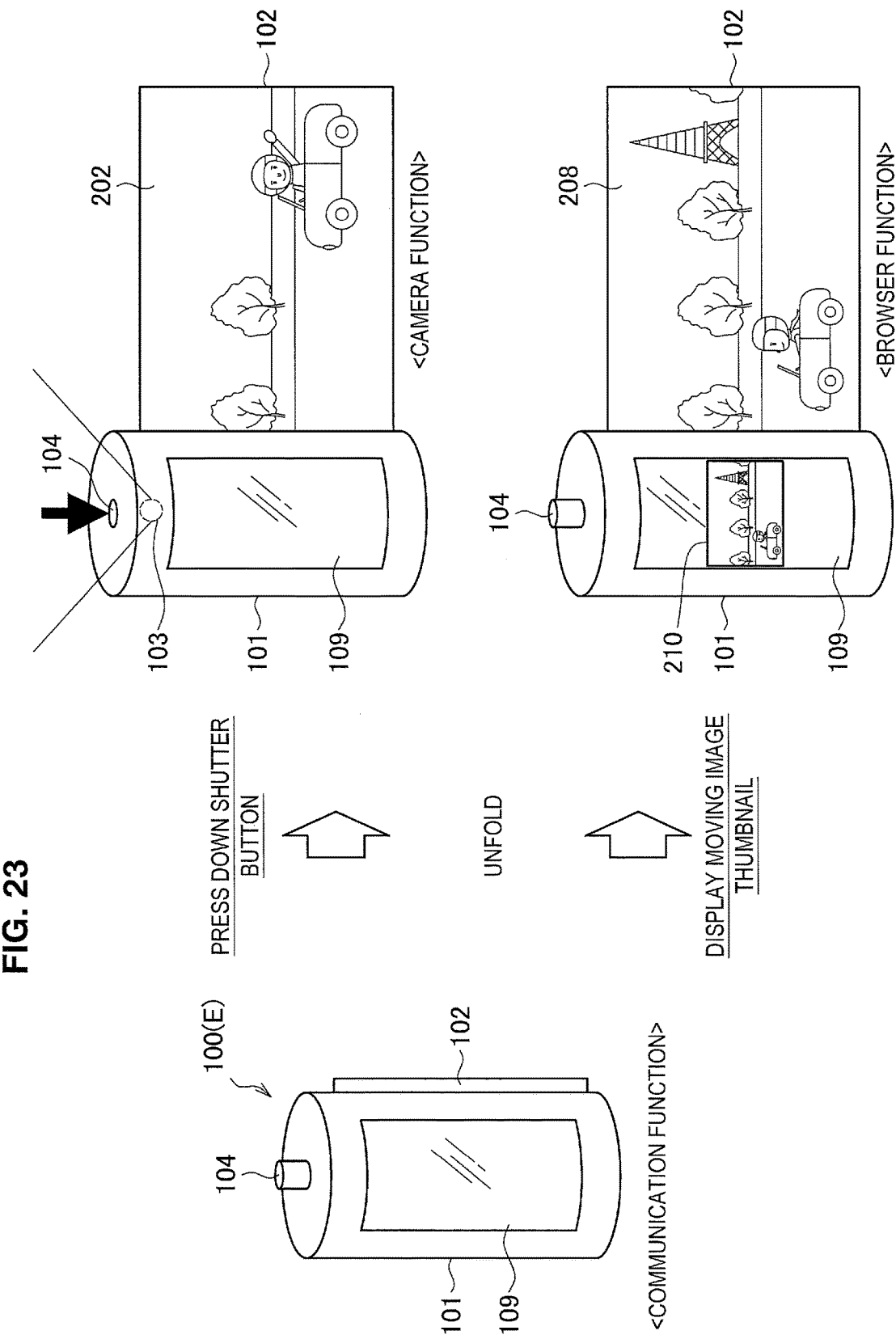
FIG. 23 is an explanatory diagram for describing a function of an image shooting device according to a fourth embodiment of the present disclosure.
Figure 24:
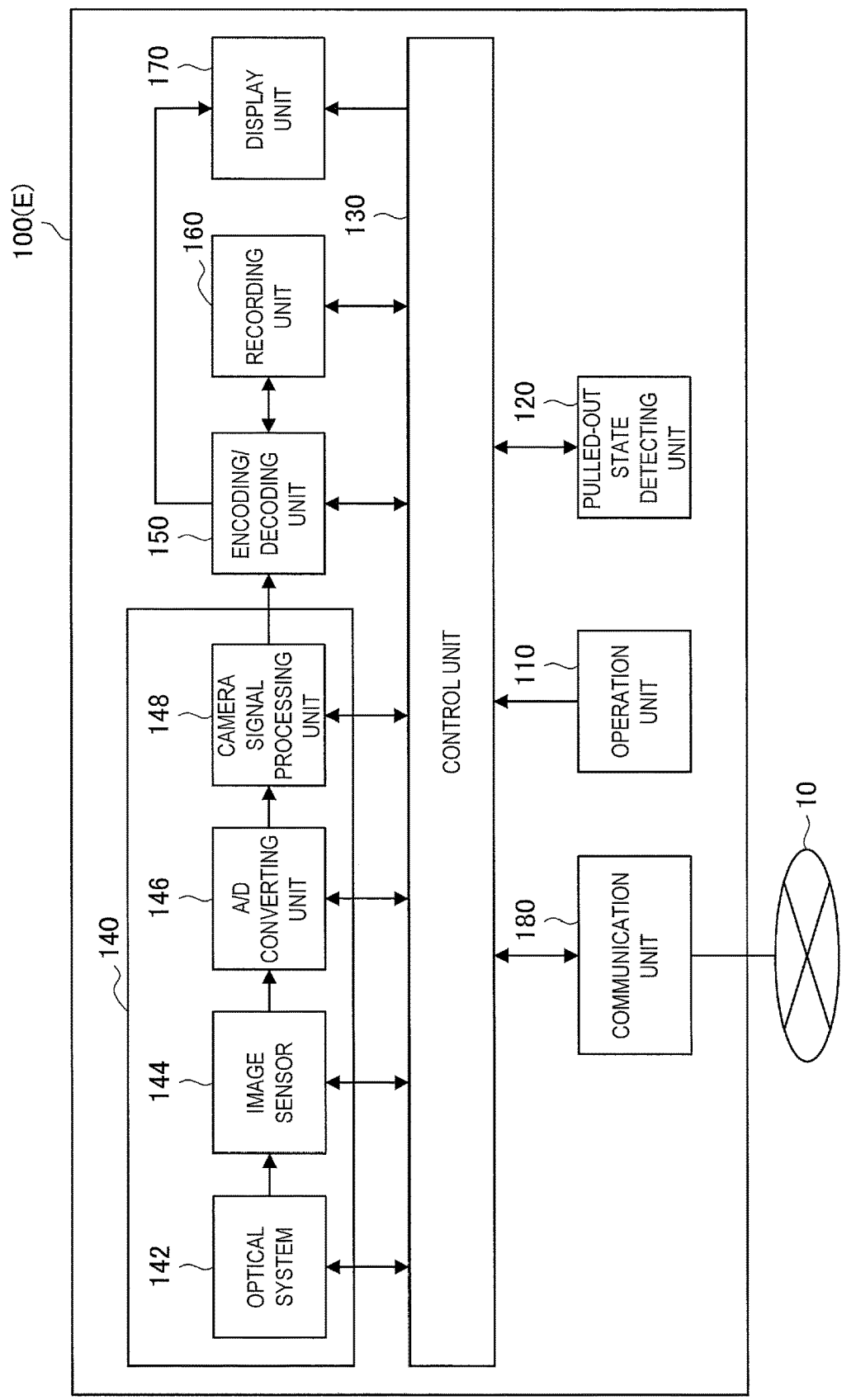
FIG. 24 is a block diagram illustrating a functional configuration of the image shooting device according to the embodiment.
Figure 25:
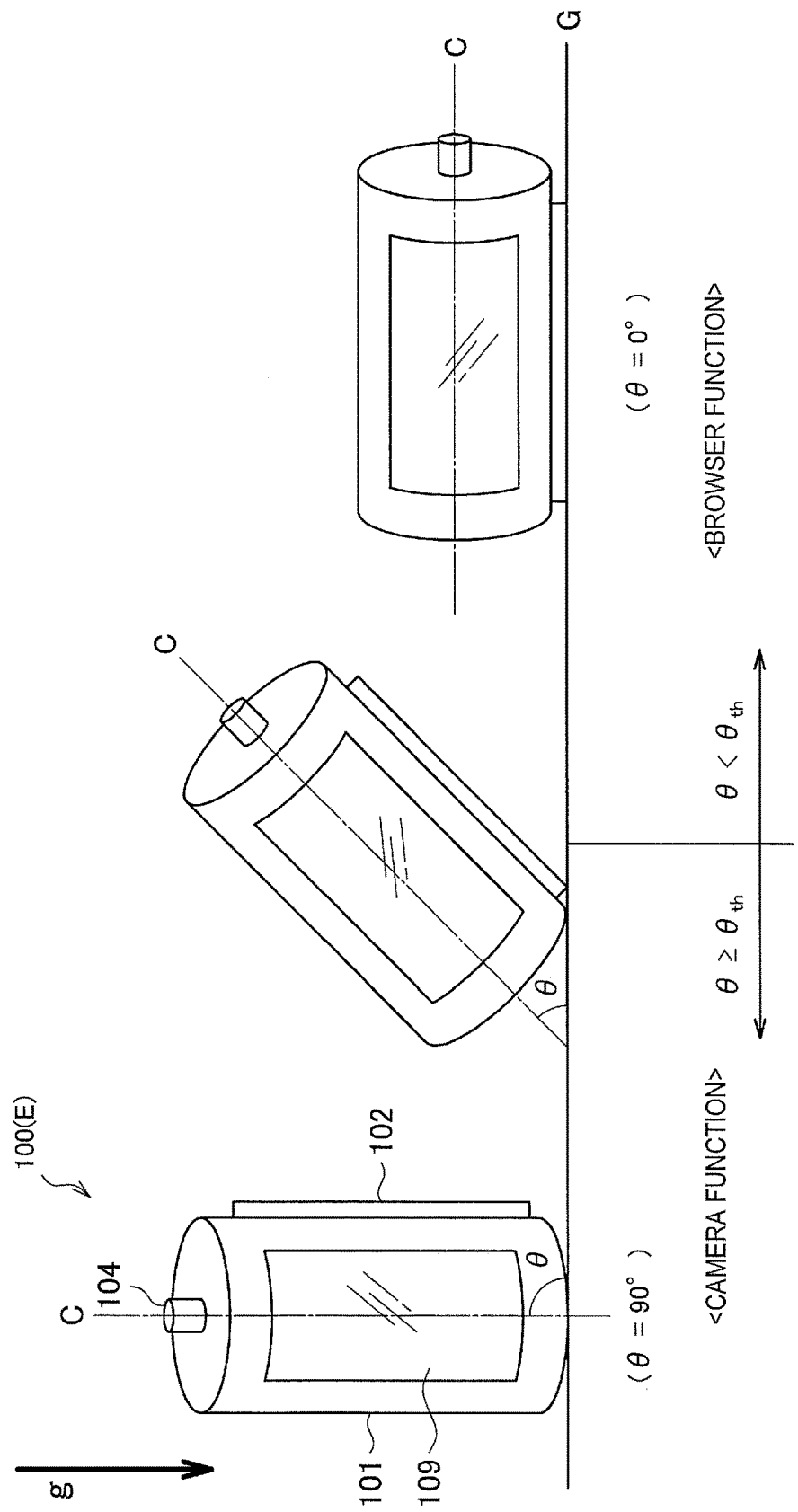
FIG. 25 is an explanatory diagram for describing that a camera function and a browser function are switched on the basis of inclination of the image shooting device.

Next, display control exerted by the control unit 130 of the image shooting device 100 according to a fourth embodiment of the present disclosure will be described with reference to FIGS. 23 to 25. FIG. 23 is an explanatory diagram for describing the function of an image shooting device 100(E) according to the present embodiment. FIG. 24 is a block diagram illustrating a functional configuration of the image shooting device 100(E) according to the present embodiment. FIG. 25 is an explanatory diagram for describing that a camera function and a browser function are switched on the basis of inclination of the image shooting device 100(E).

[4.1. Schematic Configuration of Image Shooting Device]

First of all, a schematic configuration of an image shooting device 100(E) according to the fourth embodiment of the present disclosure will be described with reference to FIGS. 23 and 24. The image shooting device 100(E) according to the present embodiment also has a communication function in addition to a camera function of shooting an image of an image shooting target. That is to say, as illustrated in FIG. 24, the image shooting device 100(E) further includes a communication unit 180 in addition to the configuration illustrated in FIG. 7.

The communication device 180 is a communication interface including a communication device and the like for a connection to a communication network 10. The communication unit 180 may be a communication device supporting wireless local area networks (LANs), a communication device supporting wireless USB, or a wired communication device that performs wired communication. Since the image shooting device 100(E) has the communication function, the image shooting device 100(E) functions as an Internet terminal having a telephone call function, a web browser function, and the like.

The functional configurations of the image shooting device 100 according to the first to third embodiments can be applied to other functional configurations. Accordingly, the description of them will be omitted here.

This image shooting device 100(E) may also be formed like the image shooting devices 100(A) and (B) illustrated in FIGS. 1 to 3. Alternatively, a touch panel 109 may also be installed on the back as illustrated in FIG. 23. A display device such as a liquid crystal panel and an input device such as a touch sensor are integrated into the touch panel 109, and it is possible to make an operation input by contacting or approaching an operation object onto the touch panel 109 while showing information displayed on the touch panel 109. Additionally, the present technology is not limited to the example, but a display device such as a liquid crystal panel may also be installed apart from an input device such as a touch sensor.

[4.2. Switching Functions of Image Shooting Device]

The image shooting device 100(E) has a camera function enabled in the image shooting mode, a browser function enabled in the display mode, and a communication function. For example, the image shooting device 100(E) may include a switching button (not illustrated) for switching these functions to switch the respective functions, and the respective functions may be sequentially switched and enabled every time the switching button is pressed down. Alternatively, these functions may also be switched on the basis of the state of the pulled-out display unit 102 of the image shooting device 100(E), an operation on the operation unit 110, and the like.

For example, when the display unit 102 of the image shooting device 100(E) is closed as illustrated in the left part of FIG. 23, the communication function is enabled. To the contrary, when the display unit 102 of the image shooting device 100(E) is pulled out from the body 101, the camera function or the browser function is enabled.

The camera function may be enabled, for example, when the display unit 102 is pulled out from the body 101 and the shutter button 104 is pressed down. Specifically, for example, when the display unit 102 is pulled out with the shutter button 104 pressed down, the camera function may be enabled. Alternatively, when the shutter button 104 stays pressed for a few seconds such as one second before the display unit 102 is pulled out, the camera function may be enabled. The shutter button 104 may be then half pressed or pressed down for an instant.

The pulled-out display unit 102 displays the shot image 202 acquired by the image shooting unit 140. The shot image 202 is then displayed on the display unit through the display process mentioned in each of the above-described embodiments.

Meanwhile, the browser function may be enabled, for example, when the display unit 102 is pulled out from the body 101 with a reproduction candidate of the moving image 208 displayed on the touch panel 109. The reproduction candidate of the moving image 208 is displayed on the touch panel 109, for example, as a thumbnail 210 of the moving image 208. When the touch panel 109 displays one thumbnail 210, the moving image 208 corresponding to the thumbnail 210 is displayed and reproduced on the display unit 102. When the touch panel 109 displays a plurality of thumbnails 210, one of the thumbnails 210 is selected for reproduction and then the display unit 102 is reproduced, thereby displaying and reproducing the moving image 208 corresponding to the selected thumbnail 210 on the display unit 102.

When the moving image 208 is reproduced and displayed on the display unit 102, the display process mentioned in each of the above-described embodiments can also be applied.

As another method for switching the camera function and the browser function of the image shooting device 100(E), the functions may be switched in accordance with the posture of the body 101 of the image shooting device 100(E). The image shooting device 100(E) then includes, for example, a gyro sensor and an acceleration sensor. Since the shutter button 104 is installed, for example, on the top of the image shooting device 100(E) in most cases, the image shooting device 100(E) is frequently supposed to stand upright as illustrated in the left part of FIG. 25 when the camera function is enabled. Meanwhile, when the browser function is enabled, the horizontally long touch panel 109 of the image shooting device 100(E) having the shape as illustrated in FIG. 25 offers an image easier to look at.

When each function is enabled in this way, the functions are switched on the basis of the posture of the image shooting device 100(E), thereby allowing a user to enable an appropriate function without performing an operation of switching the functions.

The camera function and the browser function may be switched on the basis of an angle θ formed by a posture axis C of the image shooting device 100(E) and the ground G in the example of FIG. 25. The posture axis C of the image shooting device 100(E) is parallel with the longitudinal direction of the image shooting device 100(E), and vertical to the pulling-out direction of the display unit 102 in the present example. For example, when the angle θ is greater than or equal to a predetermined angle θth, the shutter button 104 is located on the perpendicular upper side and the camera function is enabled. Meanwhile, when the angle θ is less than the predetermined angle θth, the touch panel 109 is horizontally long and the browser function is enabled. The angle θth can be set, for example, as 45 degrees.

Additionally, FIG. 25 is an example of switching the camera function and the browser function, and the relationship between the posture of the image shooting device 100 and the angle θth can be set as appropriate in accordance with the shape or the like of the image shooting device 100. The camera function and the browser function are switched on the basis of the posture of the image shooting device 100, but it is also possible for a user to operate the operation unit 110 to switch these functions.

The functional configuration of the image shooting device 100(E) according to the fourth embodiment has been described so far. When the communication function is also provided in addition to the camera function and the browser function as described in the present embodiment, the display process according to the state of the pulled-out display unit 102 is performed as mentioned in the above-described embodiments to enable the camera function or the browser function. This makes it possible to display the shot image 202 on the display unit 102 in accordance with the intention of a user, and to present the shot image that has undergone a display process according to the state of the pulled-out display unit 102 without making the user feel strange. The respective functions are switched in association with the operation and posture of the image shooting device 100(E) while a function to be used is in operation, thereby making it possible to lessen the load on a user to perform an operation of switching the functions.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a reception unit configured to receive operation information on a user; and a control unit configured to decide, on the basis of a state of a flexible display unit pulled out from a body of an image shooting device, a corresponding range corresponding to a displayable area of the pulled-out display unit from an entire image range acquired by an image shooting unit, the state being received by the reception unit, the flexible display unit being capable of being pulled out from the body.

(2)

The information processing device according to (1), wherein the control unit decides the corresponding range from an end of the entire image range corresponding to a direction of the body corresponding to the display unit on the basis of a length of an amount of the pulled-out display unit.

(3)

The information processing device according to (1), wherein the control unit decides the corresponding range on the basis of a focal distance of an eye of a user gazing at the corresponding range.

(4)

The information processing device according to (1), wherein, when a plurality of the image shooting units are installed, the control unit decides a corresponding range for an image acquired by each of the image shooting units, and disposes each corresponding range in the displayable area in accordance with a disposition of each of the image shooting units.

(5)

The information processing device according to any one of (1) to (4), wherein, when an amount of the pulled-out display unit exceeds a length of the entire image range in a pulling-out direction, the control unit displays the entire image range on a body side area of the displayable area, and displays a captured image on a pulled-out side area of the displayable area.

(6)

The information processing device according to (5), wherein the control unit changes at least any one of a display size of the captured image to be displayed on the pulled-out side area and a display number of the captured images to be displayed on the pulled-out side area in accordance with the amount of the pulled-out display unit.

(7)

The information processing device according to (5) or (6), wherein, when the one captured image or a plurality of the captured images are selected from the captured image displayed on the pulled-out side area, the control unit makes the pulled-out side area larger than the body side area.

(8)

The information processing device according to any one of (5) to (7), wherein the control unit displays image capturing information on each of the captured images on the pulled-out side area along with each of the captured images.

(9)

The information processing device according to any one of (1) to (8), wherein, when an amount of the pulled-out display unit exceeds a length of the entire image range in a pulling-out direction, the control unit displays the entire image range on a body side area of the displayable area, and displays, on a pulled-out side area of the displayable area, an operation input unit used for inputting an image capturing control operation for the image shooting unit.

(10)

An information processing method including:
deciding, on the basis of a state of a flexible display unit pulled out from a body of an image shooting device, a corresponding range corresponding to a displayable area of the pulled-out display unit from an entire image range acquired by an image shooting unit, the flexible display unit being capable of being pulled out from the body.

(11)

An image shooting device including:
an image shooting unit;
a body including a reception unit that receives operation information on a user;
a flexible display unit capable of being pulled out from the body; and
a control unit configured to decide, on the basis of a state of the display unit pulled out from the body, a corresponding range corresponding to a displayable area of the pulled-out display unit from an entire image range acquired by the image shooting unit.

REFERENCE SIGNS LIST 100 image shooting device
101 body
102 display unit
103 lens
104 shutter button
110 operation unit
120 pulled-out state detecting unit
130 control unit
140 image shooting unit
150 encoding/decoding unit
160 recording unit
170 display unit
202 shot image
204 captured image
208 moving image
300 operation input unit

The invention claimed is:

1. An information processing device, comprising:
circuitry configured to:
receive information of a first user operation in the information processing device;
determine a first length of a first displayable area that corresponds to a first portion of a flexible display unit;
display at least one first image of a plurality of first images that are acquired by an image shooting device on the first displayable area, based on the received information and the first portion of the flexible display unit pulled out in a pulling-out direction from a body of the image shooting device;
determine a second length of a second displayable area that corresponds to a second portion of the flexible display unit,
wherein the second portion corresponds to a body side area of the flexible display unit; and
display an image range on the body side area of the flexible display unit,
wherein the first displayable area and the second displayable area are adjustable.

2. The information processing device according to claim 1,
wherein the circuitry is further configured to determine the image range based on a focal distance of a user's eye.

3. The information processing device according to claim 1,
wherein circuitry is futher configured to:
determine a corresponding image range for at least one second image acquired by each of a plurality of image shooting devices, and
display the corresponding image range based on a disposition of each of the plurality of image shooting devices.

4. The information processing device according to claim 1,
wherein the circuitry is further configured to change at least one of a display size of the at least one first image displayed on the first displayable area or a number of the plurality of captured images displayed on the pulled-out side area, based on the first length of the first displayable area of the flexible display unit pulled out from the body.

5. The information processing device according to claim 1,
wherein the first displayable area and the second displayable area are adjusted based on a selection of the at least one first image displayed on the first displayable area by a second user operation.

6. The information processing device according to claim 1,
wherein the circuitry is further configured to display image capturing information on one of the at least one first image or the first displayable area along with the at least one first image.

7. The information processing device according to claim 1,
the circuitry is further configured to:
display an operation input unit on the first displayable area, wherein the operation input unit is configured to input an image capturing control operation for the image shooting device.

8. An information processing method, comprising:

in an information processing device:

receiving information of a first user operation in the information processing device;

determining a first length of a first displayable area that corresponds to a first portion of a flexible display unit, displaying at least one image of a plurality of images that are acquired by an image shooting device on the first displayable area, based on the received information and the first portion of the flexible display unit pulled out in a pulling-out direction from a body of the image shooting device;

determining a second length of a second displayable area that corresponds to a second portion of the flexible display unit, wherein the second portion corresponds to a body side area of the flexible display unit; and displaying an image range on the body side area of the flexible display unit:

wherein the first displayable area and the second displayable area are adjustable.

9. An image shooting device, comprising:

at least one image sensor configured to capture an image;

a body that has a part of a cylindrical shape;

a flexible display unit that is pulled out from the body; and circuitry configured to:

determine a first length of a first displayable area that corresponds to a first portion of a flexible display unit;

display the captured image, based on the first portion of the flexible display unit pulled out in a pulling-out direction from the body;

determine a second length of a second displayable area that corresponds to a second portion of the flexible display unit, wherein the second portion corresponds to a body side area of the flexible display unit; and display an image range on the body side area of the flexible display unit, wherein the first displayable area and the second displayable area are adjustable.

* * * * *